United States Patent
Ohkawara et al.

(10) Patent No.: US 6,504,585 B2
(45) Date of Patent: Jan. 7, 2003

(54) LIQUID CRYSTAL DISPLAY DEVICE HAVING A PATTERN VARYING THE OVERLAP OF A LIGHT-SHIELD FILM CONNECTED TO THE NEIGHBORING GATE LINE AND THE PIXEL ELECTRODE TO IMPROVE VOLTAGE DIFFERENCE BETWEEN DIFFERENT PIXEL ELECTRODES

(75) Inventors: Hiroshi Ohkawara, Mobara (JP); Takanori Nakayama, Mobara (JP); Takeshi Tanaka, Mobara (JP); Hikaru Itoh, Mobara (JP); Tatsuo Kamei, Mobara (JP); Tetsuya Kawamura, Mobara (JP); Masataka Natori, Mobara (JP); Hidetaka Hakoda, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/808,995

(22) Filed: Mar. 16, 2001

(65) Prior Publication Data

US 2001/0012076 A1 Aug. 9, 2001

Related U.S. Application Data

(62) Division of application No. 09/113,184, filed on Jul. 10, 1998, now Pat. No. 6,249,325.

(30) Foreign Application Priority Data

Jul. 11, 1997 (JP) .............................................. 9-186375

(51) Int. Cl.[7] ........................................... G02F 1/1343
(52) U.S. Cl. ......................................... 349/38; 349/111
(58) Field of Search .............................. 349/38, 39, 111, 349/143, 110

(56) References Cited

U.S. PATENT DOCUMENTS

| | | | |
|---|---|---|---|
| 5,519,521 A | | 5/1996 | Okimoto et al. |
| 5,668,613 A | | 9/1997 | Kim et al. |
| 6,028,650 A | * | 2/2000 | Kuroha et al. ................. 349/38 |
| 6,249,325 B1 | * | 6/2001 | Ohkawara et al. ............ 349/38 |

FOREIGN PATENT DOCUMENTS

| | | | |
|---|---|---|---|
| JP | 5-232509 | | 9/1993 |
| JP | 05232509 A | * | 9/1993 |
| JP | 05232512 A | * | 9/1993 |
| JP | 9-258261 | | 10/1997 |
| JP | 09258261 A | * | 10/1997 |
| JP | 10-39328 | | 2/1998 |
| JP | 10039328 A | * | 2/1998 |

* cited by examiner

Primary Examiner—Toan Ton
Assistant Examiner—Andrew Schechter
(74) Attorney, Agent, or Firm—Antonelli, Terry, Stout & Kraus, LLP.

(57) ABSTRACT

A liquid crystal display device includes first and second gate signal line formed on a first insulating substrate and arranged adjacent to one another, a terminal electrically connected to the first gate signal line, first and second thin-film transistors, a first pixel electrode electrically connected to an electrode of the first thin-film transistor, a second pixel electrode electrically connected to an electrode of the second thin-film transistor, a first and second video signal lines, a second insulating substrate which is transparent and superposed on the first insulating substrate, a transparent common electrode, and liquid crystals provided between the common electrode and the first and second pixel electrodes. A first light-shielding film is formed on the second insulating substrate and covers peripheries of the first and second pixel electrodes, and second light-shielding films are formed on the first insulating substrate.

5 Claims, 30 Drawing Sheets

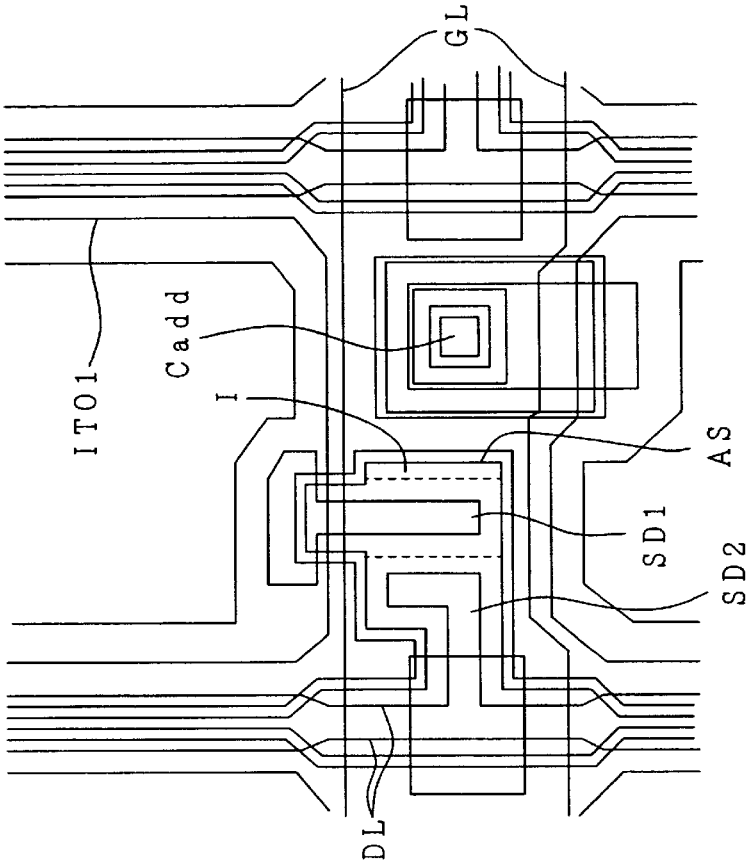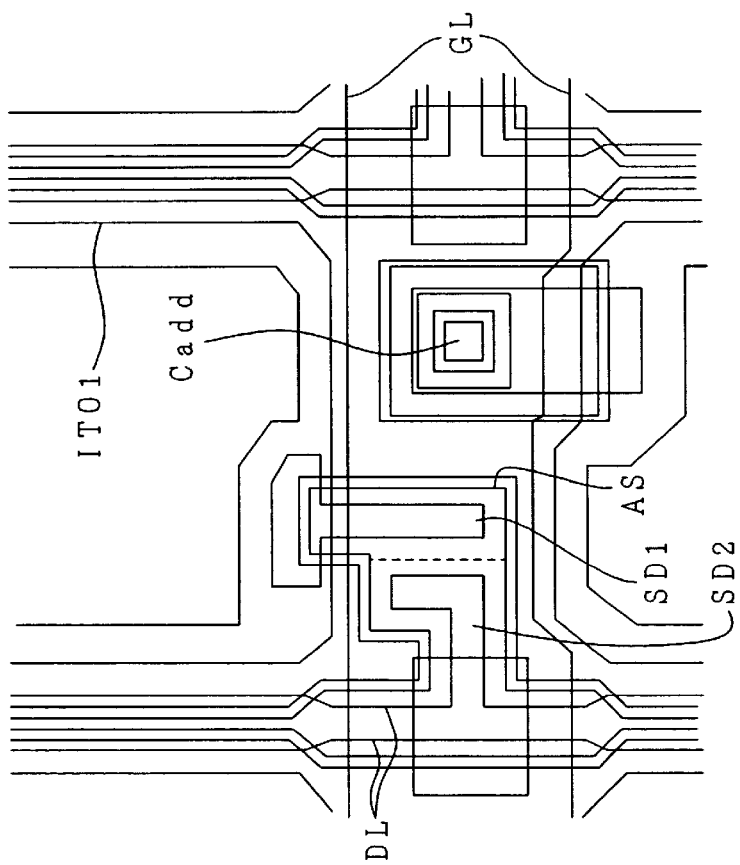
FIG. 9 (a)
FIG. 9 (b)

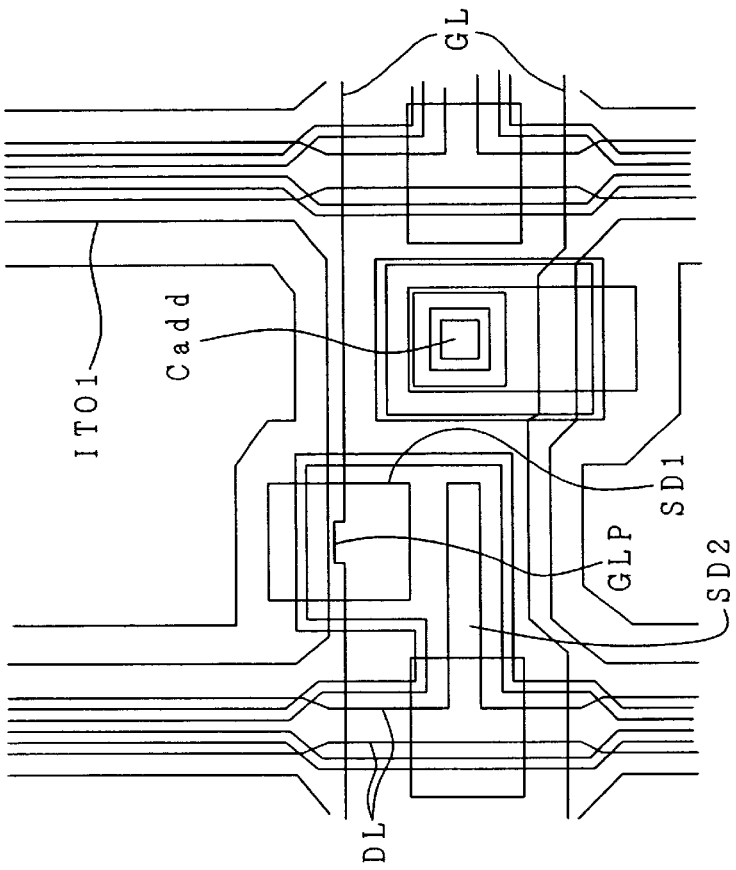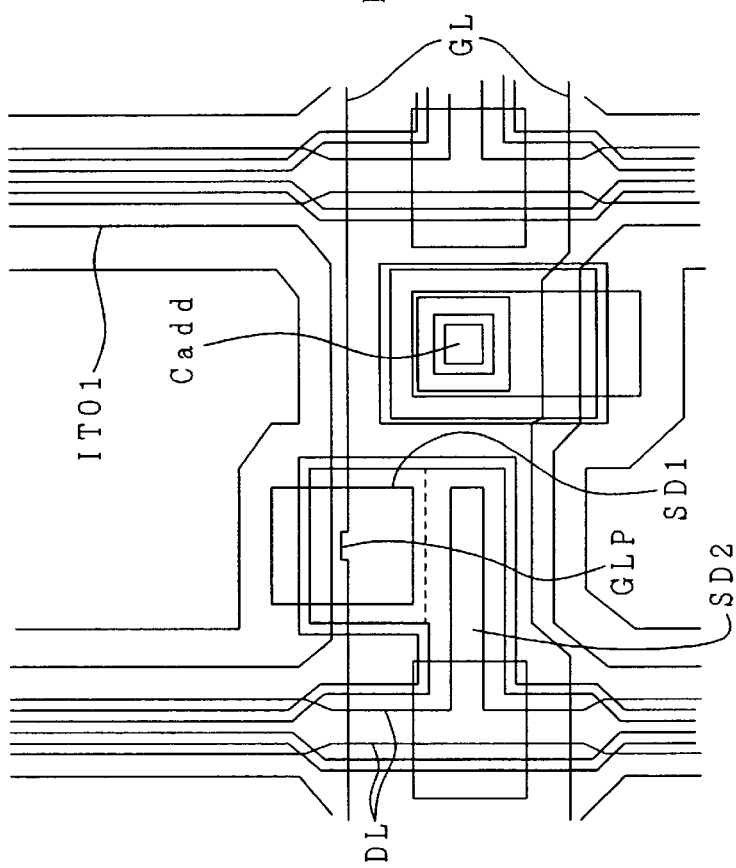

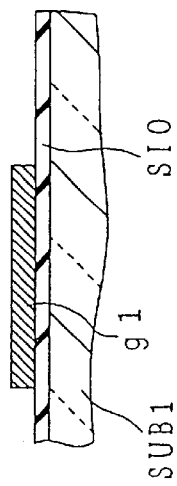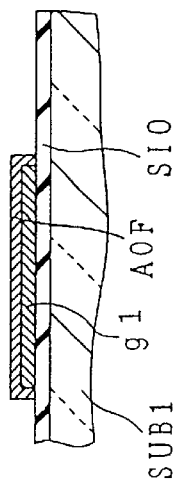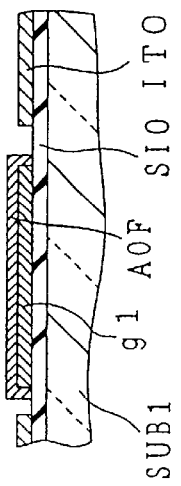
FIG. 19

FIG. 20
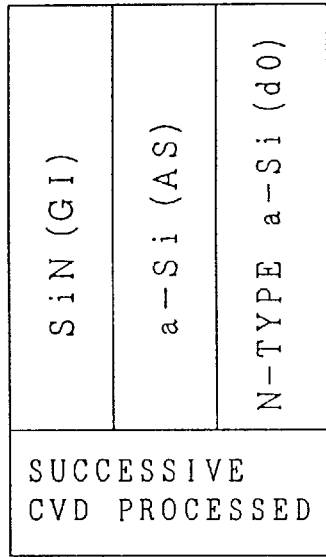
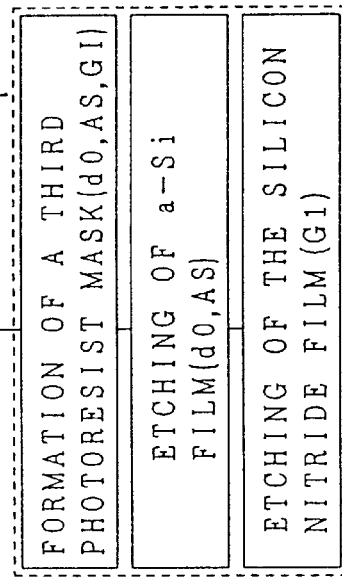
step D
| SiN(GI) | a-Si(AS) | N-TYPE a-Si(d0) |
SUCCESSIVE CVD PROCESSED
step E
FORMATION OF A THIRD PHOTORESIST MASK(d0,AS,GI)
ETCHING OF a-Si FILM(d0,AS)
ETCHING OF THE SILICON NITRIDE FILM(G1)
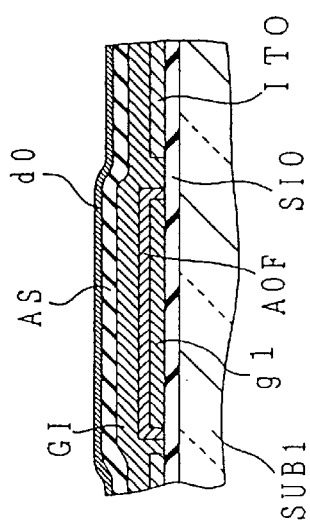
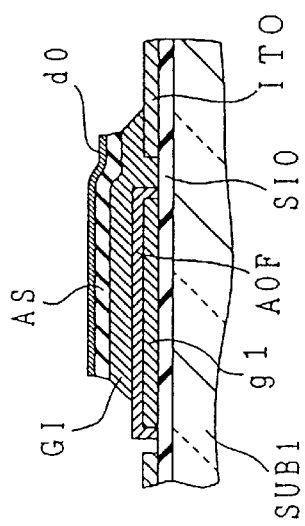

FIG. 21
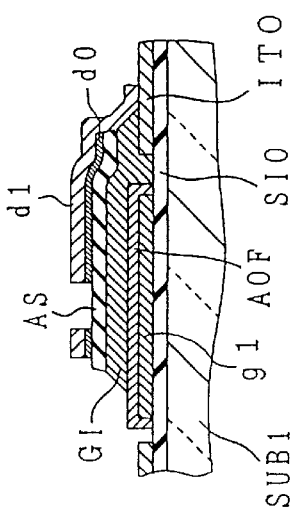
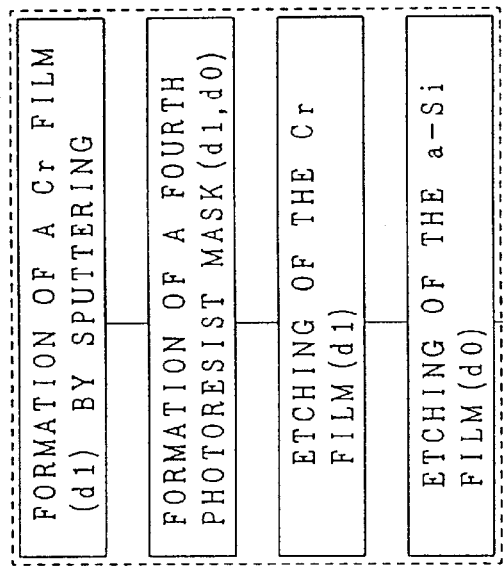
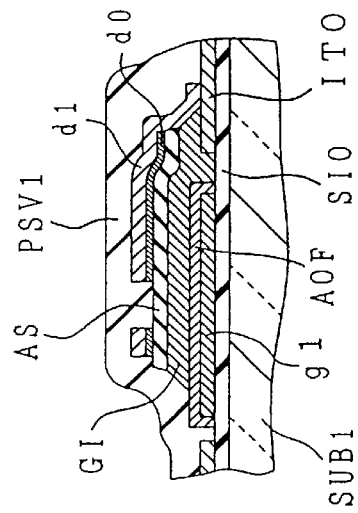
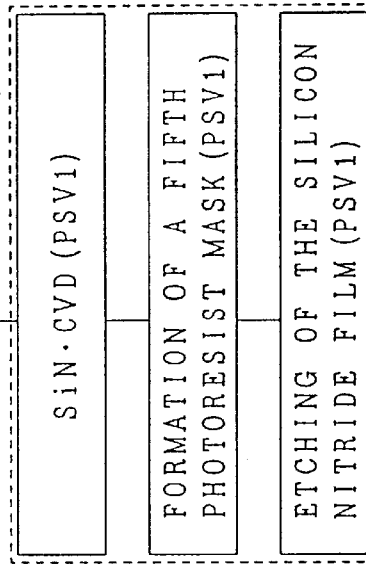

FIG. 36 (a)
FIG. 36 (b)
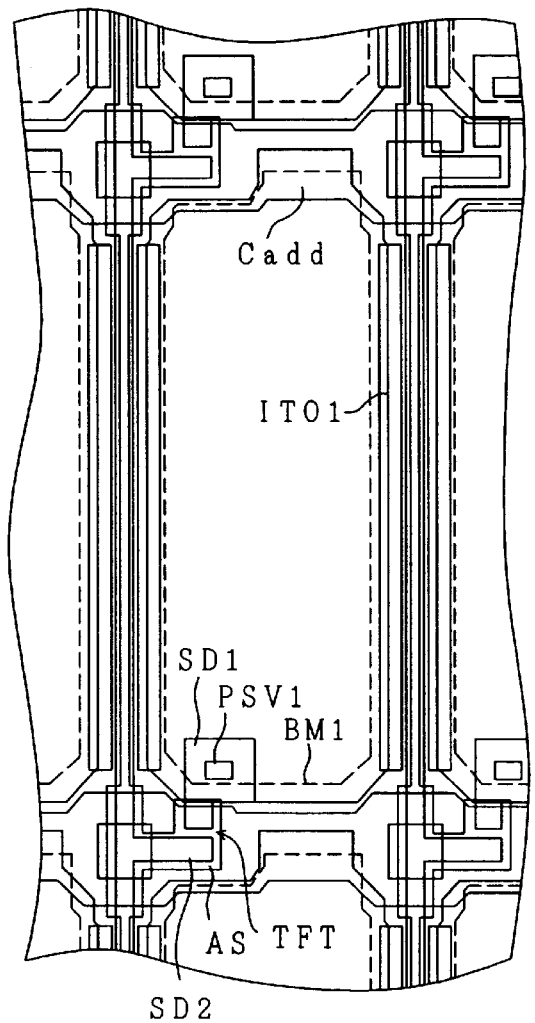
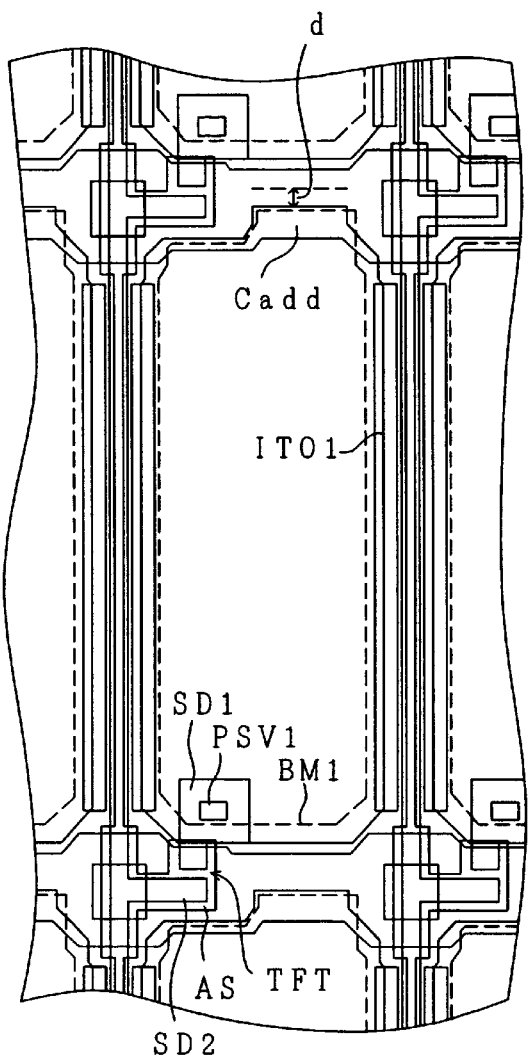

LIQUID CRYSTAL DISPLAY DEVICE HAVING A PATTERN VARYING THE OVERLAP OF A LIGHT-SHIELD FILM CONNECTED TO THE NEIGHBORING GATE LINE AND THE PIXEL ELECTRODE TO IMPROVE VOLTAGE DIFFERENCE BETWEEN DIFFERENT PIXEL ELECTRODES

CROSS REFERENCE TO RELATED APPLICATION

This is a divisional of U.S. application Ser. No. 09/113,184, filed Jul. 10, 1998, now U.S. Pat. No. 6,249,325, the subject matter of which is incorporated by reference herein.

BACKGROUND OF THE INVENTION

The present invention relates to a liquid crystal display device and, particularly, to a liquid crystal display device of the active matrix type.

A liquid crystal display device of the active matrix type is equipped with gate signal lines that are arranged in parallel lines in the y-direction and extend in the x-direction, and drain signal lines arranged in parallel lines in the x-direction and extend in the y-direction, these lines being disposed on the surface of the one transparent substrate of a pair of transparent substrates which are opposed to each other with liquid crystals being disposed therebetween. The signal lines are disposed on the surface of the one transparent substrate facing the liquid crystals, and the regions surrounded by these signal lines serve as inspection pixel regions. Every pixel region is equipped with a thin-film transistor, that is turned on by a scanning signal from the gate signal line, and a pixel electrode to which is applied a video signal from the drain signal line via the thin-film transistor that is turned on. Such a liquid crystal display device exhibits a good contrast and is indispensable, particularly, in color liquid crystal display devices.

SUMMARY OF THE INVENTION

Accompanying a recent trend toward fabricating large, high definition liquid crystal display devices, however, the problem of so-called flickering of the display on the screen has become no longer negligible. In liquid crystal display devices having a diagonal size not shorter than 34 cm (13-type) in the display region, in particular, this problem is becoming more serious. The present inventors have pursued the causes of flickering and have discovered the following facts.

First, for a large size display screen, the gate signal lines must be formed so as to be long. Being affected by the resistances and capacitances of the signal lines, therefore, the waveforms of signals input to the scanning signal lines are distorted toward the ends thereof. This distortion in the waveform delays the gate turn-off timing of the thin-film transistor and causes the potential of the source electrode to decrease less due to a voltage that is applied thereto through a capacity across the gate and the source of the thin-film transistor when the gate is turned off. This means that the potential of the source electrode on the end of the line becomes high relative to the input terminal side of the gate signal line. On the other hand, the electrode (common electrode) opposed to the pixel electrodes via the liquid crystals is supplied with a predetermined potential which is uniform over the display surface. Therefore, the voltage applied to the liquid crystals will vary between the input terminal side of the gate signal lines and the end thereof.

Furthermore, in order to avoid a polarization of the liquid crystals, an AC drive has been employed according to which the potential applied to the liquid crystals is periodically inverted. Therefore, the magnitude of voltage applied to the liquid crystals is inverted between the input terminal side and the end of the gate signal line for every one-half period of the AC drive, and so flickering occurs on the screen due to a periodic change in the brightness. In particular, a liquid crystal display device of the 13-type has a display region measuring 20 cm high and 27 cm wide, whereby the gate signal lines have a length of not shorter than 27 cm, and so, with lines of this length, the difference in the voltage that is applied via the capacity across the gate and the source of the thin-film transistors between the input terminal side of the gate signal lines and the end thereof is no longer negligible. In the liquid crystal display device having gate signal lines not shorter than 27 cm (not smaller than 13-type), therefore, it is no longer possible to completely eliminate flickering by simply adjusting the potential of the common electrode.

In addition, when the signal lines and the thin-film transistors are to be formed by selective etching based upon standard photolithography technology, it is difficult to completely uniformalize the pattern of the thin-film transistor for each of the pixel regions due to distortion in the optical system of the exposing device or due to deflection of light by the transparent substrate. In this case, when the capacity across the gate and the source of the thin-film transistor is no longer uniform due to dispersion in the pattern, the amount of drop of the source potential due to the capacity across the gate and the source of the thin-film transistor at the time the gate is turned off becomes no longer uniform on the screen. In this case too, therefore, flicking occurs on the screen due to a change in the brightness for the same reason as described above.

The present invention was accomplished in view of the above-mentioned circumstances, and its object is to provide a liquid crystal display device which is capable of completely suppressing the occurrence of flickering even when the liquid crystal display device has a large display screen.

Briefly described below are representative examples of the invention disclosed in this application.

A first aspect of the invention involves a liquid crystal display device having a gate signal line formed on a first insulating substrate; a drive circuit electrically connected to said gate signal lines to produce a gate drive voltage; first and second thin-film transistors each having a source electrode, a gate electrode and a drain electrode; a first pixel electrode electrically connected to either the source electrode or the drain electrode of said first thin-film transistor; a second pixel electrode electrically connected to either the source electrode or the drain electrode of said second thin-film transistor; a first video signal line electrically connected to the other one of the source electrode or the drain electrode of said first thin-film transistor; and a second video signal line electrically connected to the other one of the source electrode or the drain electrode of said second thin-film transistor. The gate electrode of said first thin-film transistor is electrically connected to a first portion of said gate signal line; and, the gate electrode of said second thin-film transistor is electrically connected to a second portion which is remoter than the first portion of said gate signal line from said drive circuit. The source electrodes of said first and second thin-film transistors are separated from said drain electrodes by a channel length on said gate electrodes and are opposed thereto by a channel width; the channel length and the channel width of said second thin-film transistor are substantially equal to the channel length and the channel width of said first thin-film transistor; and the electrostatic capacity between said second pixel electrode and said gate signal line is selected to be larger than the electrostatic capacity between said first pixel electrode and said gate signal line.

In the thus constituted liquid crystal display device, the shift of the potential of the pixel electrode toward the forward direction, due to a distorted waveform of a scanning signal on the gate signal line, is canceled by the shift of the potential of the pixel electrode toward the negative direction, due to the jumping voltage through the capacity Cgs, so that an equal voltage is applied to the pixel electrodes on the input terminal side close to the drive circuit and to the pixel electrodes of the end side remote from the drive circuit. This makes it possible to suppress flickering on the screen caused by a change in the brightness.

A second aspect of the invention involves a liquid crystal display device having a gate signal line formed on a first insulating substrate; a drive circuit electrically connected to said gate signal line to produce a gate drive voltage; first and second thin-film transistors each having a source electrode, a gate electrode and a drain electrode; a first pixel electrode electrically connected to either the source electrode or the drain electrode of said first thin-film transistor; a second pixel electrode electrically connected to either the source electrode or the drain electrode of said second thin-film transistor, a first video signal line electrically connected to the other one of the source electrode or the drain electrode of said first thin-film transistor; and a second video signal line electrically connected to the other one of the source electrode or the drain electrode of said second thin-film transistor. The gate electrode of said first thin-film transistor is electrically connected to a first portion of said gate signal line; and, the gate electrode of said second thin-film transistor is electrically connected to a second portion which is remoter than the first portion of said gate signal line from said drive circuit. The electrostatic capacity between said second pixel electrode and said gate signal line is selected to be larger than the electrostatic capacity between said first pixel electrode and said gate signal line; the source electrodes of said first and second thin-film transistors are separated from said drain electrodes by a channel length on said gate electrodes and are opposed thereto by a channel width; and the width of a section from a portion on where either the source electrodes or the drain electrodes of the first and second thin-film transistors are connected to said pixel electrode and on where said gate electrode is superposed to a portion where said gate electrode is not superposed any more, is selected to be smaller than the channel width of said first and second thin-film transistors.

According to the thus constituted liquid crystal display device, even when the source electrode of the thin-film transistor is deviated in position at the time when it is being formed, it is possible to minimize a change in the area where the source electrode is superposed on the gate electrode. This makes it possible to minimize a change in the capacity Cgs between the gate electrode and the source electrode and to suppress flickering on the screen caused by a change in the brightness.

A third aspect of the invention involves a liquid crystal display device having a first gate signal line formed on an insulating substrate; a capacity line formed on said insulating substrate neighboring said first gate signal line; a terminal electrically connected to said gate signal line and to receive a drive voltage; first and second thin-film transistors each having a source electrode, a gate electrode and a drain electrode; a first pixel electrode electrically connected to either the source electrode or the drain electrode of said first thin-film transistor; a second pixel electrode electrically connected to either the source electrode or the drain electrode of said second thin-film transistor; a first video signal line electrically connected to the other one of the source electrode or the drain electrode of said first thin-film transistor; and a second video signal line electrically connected to the other one of the source electrode or the drain electrode of said second thin-film transistor. The gate electrode of said first thin-film transistor is electrically connected to a first portion of said gate signal line; and the gate electrode of said second thin-film transistor is electrically connected to a second portion which is remoter than the first portion of said first gate signal line from said terminal. The source electrodes of said first and second thin-film transistors are separated from said drain electrodes by a channel length on said gate electrodes and are opposed thereto by a channel width; the channel length and the channel width of said second a thin-film transistor are substantially equal to the channel length and the channel width of said first thin-film transistor; said first and second pixel electrodes are partly superposed on said capacity line via an insulating film; and the area where said second pixel electrode is superposed on said capacity line is selected to be smaller than the area where said first pixel electrode is superposed on said capacity line.

In the thus constituted liquid crystal display device, the holding capacity is adjusted, and, hence, a potential drop component of the pixel electrode voltage due to the leakage of the scanning signal is prevented from changing on the input terminal side and on the end of the gate signal line in spite of a distortion in the waveform of the scanning signal. This makes it possible to suppress the flickering on the screen caused by a change in the brightness.

A fourth aspect of the invention involves a liquid crystal display device having a first gate signal line formed on an insulating substrate; a second gate signal line formed on said insulating substrate neighboring said first gate signal line; a drive circuit electrically connected to said first gate signal line to produce a gate drive voltage; first and second thin-film transistors each having a source electrode, a gate electrode and a drain electrode; a first pixel electrode electrically connected to either the source electrode or the drain electrode of said first thin-film transistor; a second pixel electrode electrically connected to either the source electrode or the drain electrode of said second thin-film transistor; a first video signal line electrically connected to the other one of the source electrode or the drain electrode of said first thin-film transistor; and a second video signal line electrically connected to the other one of the source electrode or the drain electrode of said second thin-film transistor. The gate electrode of said first thin-film transistor is electrically connected to a first portion of said first gate signal line; and, the gate electrode of said second thin-film transistor is electrically connected to a second portion which is remoter than the first portion of said first gate signal line from said drive circuit. The source electrodes of said first and second thin-film transistors are separated from said drain electrodes by a channel length on said gate electrodes and are opposed thereto by a channel width; the channel length and the channel width of said second thin-film transistor are substantially equal to the channel length and the channel width of said first thin-film transistor; said first and second pixel electrodes are partly superposed on said second gate signal line via an insulating film; and the area where said second pixel electrode is superposed on said second gate signal line is selected to be smaller than the area where said first pixel electrode is superposed on said second gate signal line.

In the thus constituted liquid crystal display device, the holding capacity is adjusted, and, hence, a drop in the potential of the pixel electrode due to leakage of the scanning signal is prevented from changing on the input terminal side and on the end of the gate signal line in spite of a distortion in the waveform of the scanning signal. This makes it possible to suppress the flickering on the screen caused by a change in the brightness. Besides, the electrode of the holding capacity also serves as a gate signal line for the neighboring line, contributing to an increase in the numerical aperture of the pixel.

A fifth aspect of the invention involves a liquid crystal display device having a gate signal line formed on a first insulating substrate; a drive circuit electrically connected to said gate signal line to produce a gate drive voltage; first and second thin-film transistors each having a source electrode, a gate electrode and a drain electrode; a first pixel electrode electrically connected to either the source electrode or the drain electrode of said first thin-film transistor, a second pixel electrode electrically connected to either the source electrode or the drain electrode of said second thin-film-transistor; a first video signal line electrically connected to the other one of the source electrode or the drain electrode of said first thin-film transistor; and a second video signal line electrically connected to the other one of the source electrode or the drain electrode of said second thin-film transistor. The gate electrode of said first thin-film transistor is electrically connected to a first portion of said gate signal line; the gate electrode of said second thin-film transistor is electrically connected to a second portion which is remoter than the first portion of said gate signal line from said drive circuit; and the electrostatic capacity between said second pixel electrode and said second video signal line is selected to be larger than the electrostatic capacity between said first pixel electrode and said first video signal line.

In the thus constituted liquid crystal display device, the electrostatic capacity between the pixel electrode and the video signal line (or the capacity between the source and the drain) can be adjusted, and, hence, a potential drop component of the pixel electrode voltage due to leakage of the scanning signal is prevented from changing on the input terminal side and on the end of the gate signal line in spite of a distortion in the waveform of the scanning signal. This makes it possible to suppress flickering on the screen caused by a change in the brightness.

A sixth aspect of the present invention involves a liquid crystal display device having a gate signal line formed on a first insulating substrate; a terminal electrically connected to said gate signal line to receive a drive voltage; first and second thin-film transistors each having a source electrode, a gate electrode and a drain electrode; a first pixel electrode electrically connected to either the source electrode or the drain electrode of said first thin-film transistor; a second pixel electrode electrically connected to either the source electrode or the drain electrode of said second thin-film transistor; a first video signal line electrically connected to the other one of the source electrode or the drain electrode of said first thin-film transistor; a second video signal line electrically connected to the other one of the source electrode or the drain electrode of said second thin-film transistor; a transparent second insulating substrate superposed on said first insulating substrate; a transparent common electrode provided at a position where it is opposed to said first and second pixel electrodes of said second insulating substrate; liquid crystals provided between said common electrode and said first and second pixel.electrodes; and a light-shielding film formed on said second insulating substrate to cover the peripheries of said first and second pixel electrodes. The gate electrode of said first thin-film transistor is electrically connected to a first portion of said gate signal line; the gate electrode of said second thin-film transistor is electrically connected to a second portion which is remoter than the first portion of said gate signal line from said terminal; and the area of a portion where said second pixel electrode is covered with said light-shielding film is selected to be smaller than the area of a portion where said first pixel electrode is covered with said light-shielding film.

In the thus constituted liquid crystal display device, the pixel capacity (liquid crystal capacity) can be adjusted, and, hence, a potential drop component of the pixel electrode due to leakage of the scanning signal if, prevented from changing on the input terminal side and on the end of the gate signal line in spite of a distortion in the waveform of the scanning signal. This makes it possible to suppress the flickering on the screen caused by a change in the brightness.

BRIEF DESCRIPTION OF THE DRAWINGS.

FIGS. 9(a) and 9(b) are plan views illustrating the liquid crystal display device according to a further embodiment of the present invention;

FIGS. 10(a) and 10(b) are plan views illustrating the liquid crystal display device according to a still further embodiment of the present invention;

FIG. 19 is a flow diagram of steps illustrating a method of fabricating a thin-film transistor substrate SUB1;

FIG. 20 is a flow diagram of steps illustrating the method of fabricating the thin-film transistor substrate SUB1;

FIG. 21 is a flow diagram of steps illustrating the method of fabricating the thin-film transistor substrate SUB1;

FIGS. 36(a) and 36(b) are plan views illustrating a pixel of the liquid crystal display device according to a further embodiment of the present invention;

DESCRIPTION OF THE PREFERRED EMBODIMENTS

The liquid crystal display device according to the preferred embodiments of the present invention will now be described with reference to the drawings.

Embodiment 1
<Equivalent Circuit of a Liquid Crystal Display Panel>

Figure 2:
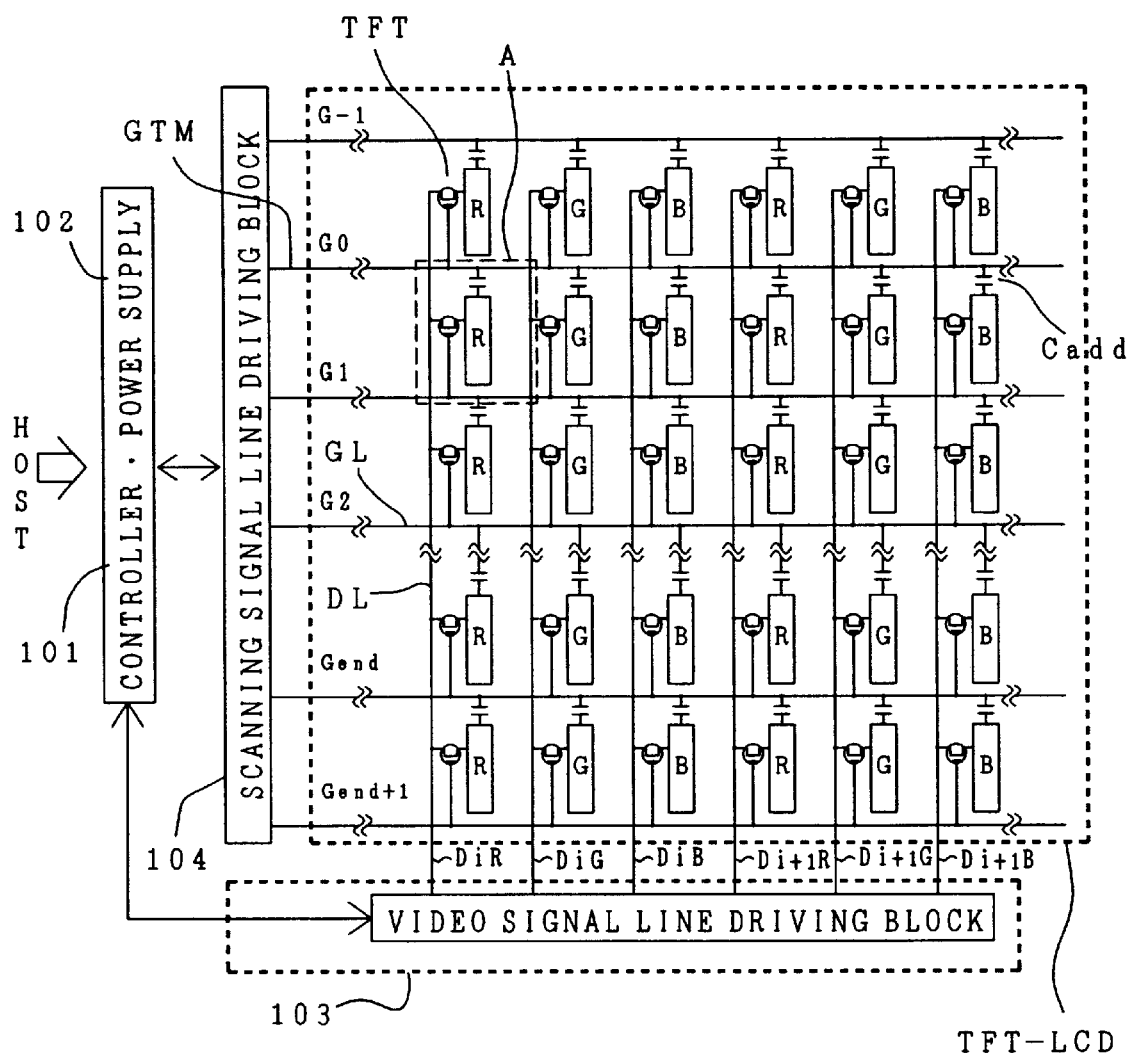
FIG. 2 is an equivalent circuit diagram of the liquid crystal display device according to the embodiment of FIG. 1.

FIG. 2 is a circuit diagram illustrating an equivalent circuit of one transparent substrate (TFT substrate) between the transparent substrates constituting a liquid crystal display panel. This circuit diagram shows a practical geometric arrangement.

On the surface of the TFT substrate TFT-LCD on the liquid crystal side in FIG. 2, there are formed gate signal lines (also called scanning signal lines) arranged in parallel lines in the y-direction and extending in the x-direction, and drain signal lines (also called video signal lines) D1 insulated from the gate signal lines GL and arranged in parallel lines in the X-direction and extending in the y-direction. Rectangular regions surrounded by the gate signal lines GL and the drain signal lines D1 constitute pixel regions. Each pixel region is provided with a thin-film transistor TFT, which is turned on by the supply of a scanning signal (voltage) from one gate signal line GL, and a pixel electrode ITO1, which is supplied with a video signal (voltage) from one drain signal line through the thin-film transistor TFT that is turned on. The pixel electrode ITO1 is constituted by a transparent conducting layer of, for example, indium-tin-oxide. An additional capacitor element Cadd is formed between the pixel electrode ITO1 and another gate signal line GL so that a video signal applied to the pixel electrode ITO1 can be stored for an extended period of time when the thin-film transistor TFT is turned off.

A symbol R, G or B is used to identify each pixel electrode ITO1. These symbols represent the colors red, green and blue, which are the three primary colors and which produce corresponding colors in the pixel regions. More specifically, there is formed a filter of a color corresponding to the filter substrate (second transparent substrate SUB2), which is disposed so as to be opposed to the TFT substrate (first transparent substrate SUB1).

To the display panel are connected a scanning signal line driving block 104 and a video signal line driving block 103, which represent external circuits. The scanning signal line driving block 104 successively inputs scanning signals to the gate signal lines, and in synchronism with these timings, the video signal line driving block 103 inputs video signals to the drain signal lines. A power supply 102 and a controller 101 are connected to the scanning signal line driving block 104 and to the video signal line driving block 103, whereby electric power is supplied to these circuit blocks and signals are transmitted thereto.

On the surface of the liquid crystal side of the other transparent substrate (filter substrate), which is opposed to the above-mentioned TFT substrate TFT via the liquid crystals, there is formed a black matrix layer along the edges of the frame of each pixel region. A color filter is formed to cover the pixel region in such a manner that the peripheries thereof are superposed on the black matrix layer BM. A common electrode of a transparent conducting layer is formed via a protection film which is formed covering the black matrix layer and the color filter. Besides, an orientation film is formed on the upper surface of the common electrode to limit the orientation of the liquid crystals.

<Constitution of the Pixel Region>

Figure 3:
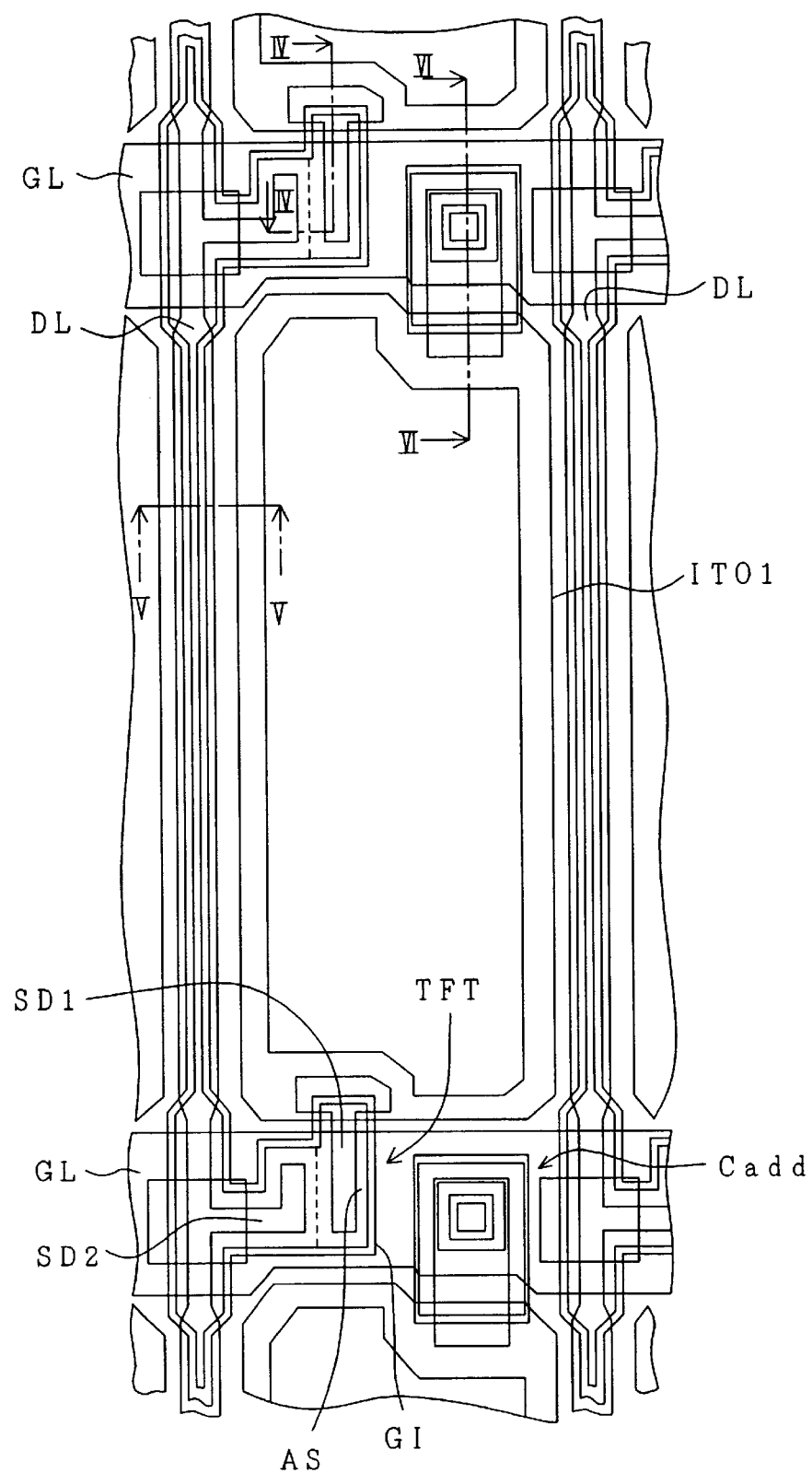
FIG. 3 is a plan view illustrating a pixel region of the liquid crystal display device according to the embodiment of the present invention.
Figure 4:
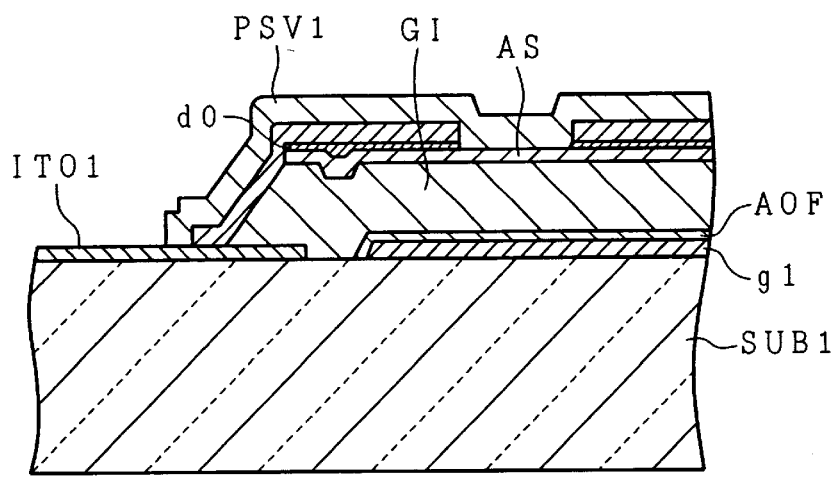
FIG. 4 is a sectional view taken along the line IV-IV of FIG. 3.
Figure 5:
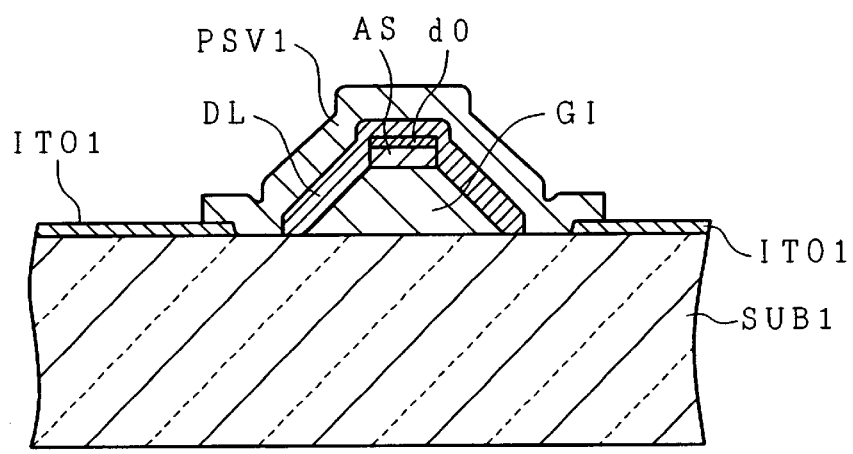
FIG. 5 is a sectional view taken along the line V—V of FIG. 3.
Figure 6:
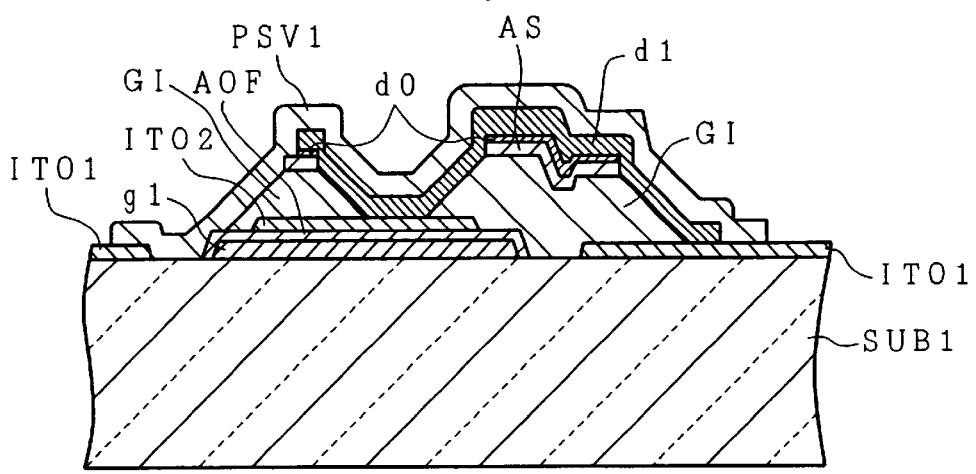
FIG. 6 is a sectional view taken along the line VI—VI of FIG. 3.
Figure 7:
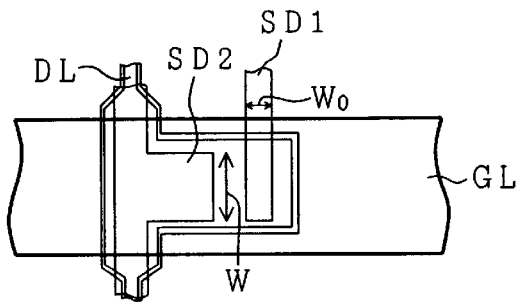
FIGS. 7(a) to 7(d) are diagrams illustrating the liquid crystal display device according to another embodiment of the present invention.
Figure 7:
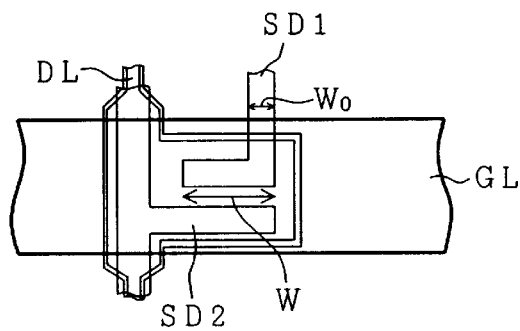
Figure 7:
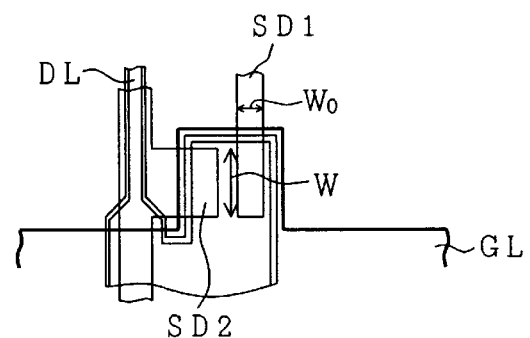
Figure 7:
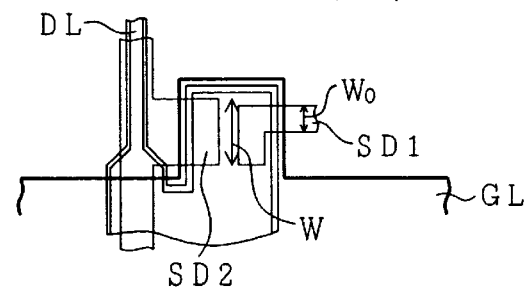

FIG. 3 is a plan view illustrating the constitution of a pixel region A in FIG. 2. FIG. 4 is a sectional view taken along the line IV—IV of FIG. 3, FIG. 5 is a sectional view taken along the line V—V of FIG. 3, and FIG. 6 is a sectional view taken along the line VI—VI of FIG. 3.

On the surface of the transparent substrate SUB1 on the liquid crystal side, there are formed gate signal lines GL arranged in parallel lines in the y-direction and extending in the x-direction. The gate signal lines GL are made of a material obtained by forming an aluminum oxide film AOF (formed by anodic formation) on the surface of a conducting layer gl of, for example, aluminum. A pixel electrode ITO1 of a transparent conducting film (e.g., indium-tin-oxide) is formed on most of the pixel region surrounded by the gate signal lines GL and the drain signal lines D1 that will be described later. Part of the gate signal line GL of the left lower side of the pixel region in the drawing is a region for forming a thin-film transistor TFT. In this region, there are formed a gate insulating film GI of, for example, SiN, a semiconductor layer AS of i-type amorphous silicon, a drain electrode SD2 and a source electrode SD1.

The source and drain are determined by a bias polarity therebetween. In the circuit of this liquid crystal display device, the polarity is inverted during the operation. It should, therefore, be noted that the source and the drain are inverted during the operation. In this specification, however, the electrode on the side which is directly connected to the pixel electrode ITO1 is expressed in a fixed manner as a source electrode.

The drain electrode SD2 and the source electrode SD1 are formed simultaneously with the drain signal line D1. That is, the drain signal line D1 is formed, in the forming region, on the gate-insulating film GI of the thin-film transistor TFT, on the insulating film GI formed simultaneously with the semiconductor layer AS, and on the semiconductor layer AS, and is constituted by a laminate of, for example, chromium and aluminum (see FIG. 5). The drain signal line D1 is formed on the region where the insulating film GI and the semiconductor layer AS are formed, so that the drain signal line D1 will not move over the step of the insulating film GI and the semiconductor layer AS. The drain electrode SD2 of the thin-film transistor TFT is formed integrally with the drain signal line D1, and the source electrode SD1 is formed so as to be separated from the drain electrode SD2 by a predetermined channel length and is extended onto part of the pixel electrode ITO1 so as to be directly superposed thereon.

Referring to FIG. 6, the additional capacitor element Cadd is constituted by a dielectric film of an aluminum oxide film AOF (or silicon nitride film GI) which is an insulating film interposed between a gate signal line (another gate signal line neighboring the gate signal line for driving the thin-film transistor TFT) GL which serves as one electrode thereof and another electrode formed by a conducting layer d1 formed simultaneously with the drain signal line D1 and a conducting layer ITO2 formed simultaneously with the pixel electrode ITO1 and is superposed on the conducting layer d1. The insulating film GI and the semiconductor layer AS are formed simultaneously with the formation of the thin-film transistor TFT. The conducting layer di which is another electrode extends onto a portion of the pixel electrode ITO1 and is directly superposed thereon.

A protection film PSV1 of SiN is formed on the surface of the thus constituted pixel region in order to avoid a deterioration in the characteristics that is caused when the liquid crystals come into direct contact with the thin-film transistor TFT. Furthermore, an orientation film (not shown) is formed on the whole surface of the protection film PSV1 in order to limit the orientation of the liquid crystals.

<Operation of TFT>

Figure 15:
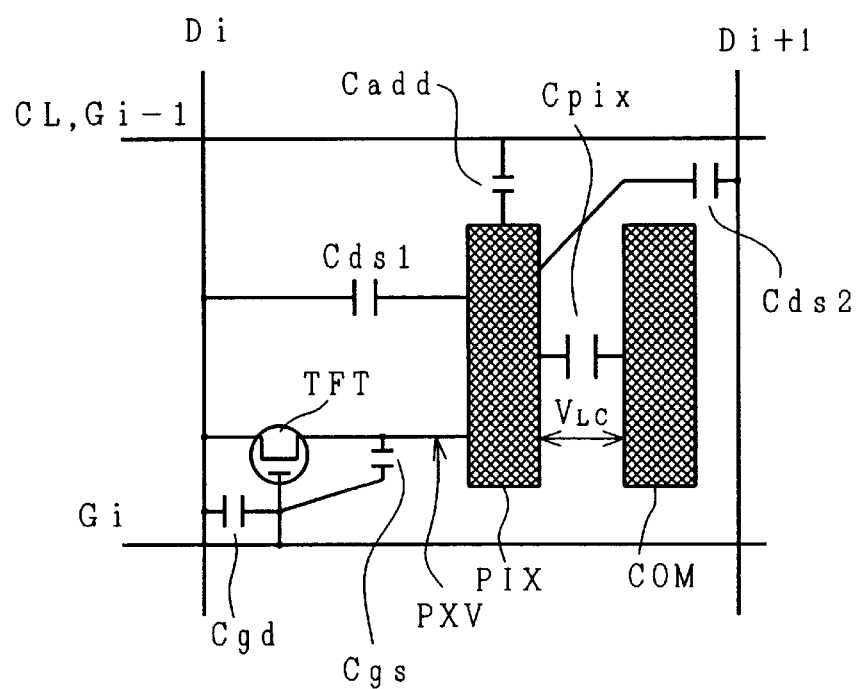
FIG. 15 is a diagram of an equivalent circuit of a unit pixel in a TFT active matrix liquid crystal display device.

FIG. 15 is a diagram of an equivalent circuit of a unit pixel in the TFT active matrix liquid crystal display device. The thin-film transistor TFT has transmission characteristics such that it is turned on (the resistance decreases between the source and the drain) when a positive bias voltage is applied to the gate electrode, and it is turned off, i.e., the resistance increases between the source and the drain, when the bias applied to the gate electrode is brought close to zero.

Figure 16:
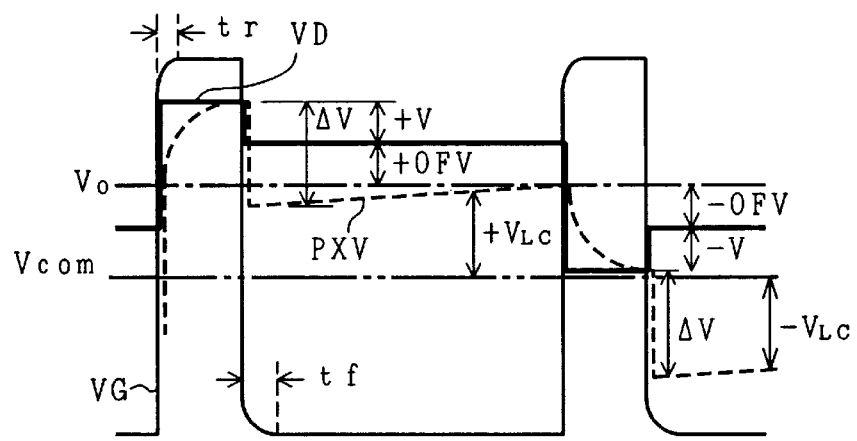
FIG. 16 is a diagram of waveforms illustrating the operation of the TFT active matrix liquid crystal display device.

FIG. 16 is a diagram of waveforms for explaining the operation of the liquid crystal display device shown in FIG. 15. In FIG. 16, the signals VG, VD and the voltage PXV of a pixel PIX are drawn so as to be slightly deviated in time to permit the waveforms to be distinguished; although, in reality, they overlap.

A video signal (drain signal) VD supplied from a video signal line D1 is written onto the pixel PIX coupled to a gate signal line Gi (GL) selected depending upon the high level of the scanning signal (gate signal) VG. In this case, as shown by a dashed line in FIG. 16, the TFT that is turned on has a resistance component, and, besides, the pixel PIX has a capacitive element Cpix, as seen in FIG. 15. Therefore, the voltage PXV of the pixel PIX rises according to a time constant corresponding thereto. FIG. 16 shows a video signal VD of a positive level for placing the pixel (or liquid crystal cell) in a state of a high gradation. Depending upon the selection of a next gate signal line Gi+1 (GL), the scanning signal VG shown in FIG. 16 is shifted to a non-selection level, which is a low level, from a selection level, which is a high level. Therefore, the TFT is turned off, and the video signal VD that is written is held by the pixel PIX, which is working as a capacitive element Cpix. In response to the scanning signal VG that is changed from the high level over to the low level, the voltage PXV of the pixel drops by a component ΔV due to a parasitic capacity Cgs between the pixel PIX (or the source electrode or the drain electrode of the TFT connected to the pixel electrode, regarded to be the source electrode for convenience) and the gate electrode of the TFT. In changing the scanning signal VG from the low level over to the high level a voltage jumping into the pixel PIX due to the coupling Cg between the gate and the source can be canceled by writing a video signal VD from the drain signal line Xi (D1). However, the voltage jumping into the pixel PIX at the time when the scanning signal VG is changed from the high level over to the low level, cannot be canceled by writing the video signal VD. In FIG. 16, the video signal VD of a low gradation level is supplied in the subsequent frame.

In general, the liquid crystal display device is driven on alternating current. Therefore, the polarity of the video signal VD is changed like positive/negative for every period of the scanning signal VG and is supplied. That is, as shown in FIG. 16, when the scanning signal VG again assumes the selection level, which is the high level, the video signal VD assumes a desired gradation level of negative polarity. FIG. 16 shows an example of a high gradation level of negative polarity. Even in this case, the TFT that is turned on has a resistance component, and, besides, the pixel PIX has a capacitive element Cpix. Therefore, the voltage PXV of the pixel breaks according to a time constant corresponding thereto. Depending upon the selection of a next gate signal line Gi+1 (not shown), the scanning signal VG shown in FIG. 16 is changed from the selection level, which is the high level, over to the non-selection level, which is the low level. Thus, the TFT is turned off, and the video signal VD is held by the pixel PIX that is working as a capacitive element Cpix.

In response to the scanning signal VG that is changed from the high level over to the low level, the voltage PXV of the pixel drops by a component ΔV due to a parasitic capacity Cgs between the gate electrode of the TFT and the source electrode. In changing the scanning signal VG from the low level over to the high level as in the case of a positive polarity, furthermore, a voltage jumping into the pixel PIX due to the coupling Cg between the gate and the source can be canceled by writing a video signal VD from the drain signal line Xi. However, the voltage jumping into the pixel PIX, at the time when the scanning signal VG is changed from the high level over to the low level, cannot be canceled by writing the video signal VD. Therefore, the voltage jumping into the pixel PIX due to the coupling Cgs between the gate and the source works to drop the voltage PXV of the pixel toward the negative direction in the case of the negative polarity, too, like in the case of the positive polarity. In FIG. 16, the video signal VD of a low gradation level of negative polarity is supplied in the subsequent frame.

In driving the liquid crystals on an alternating current as described above, when the scanning signal VG changes from the high level over to the low level either at the time of a positive polarity or a negative polarity, the voltage PXV of the pixel drops by a component ΔV, as indicated by the dashed line in FIG. 16, relative to the level of the video signal VD at a moment of writing due to the parasitic capacity Cgs between the gate electrode and the source electrode of the TFT. Therefore, a bias voltage Vcom given to the common electrode COM of the liquid crystal display panel is set to a substantially intermediate level (optimum common electrode voltage) between the positive polarity and the negative polarity of the voltage PXV of the pixel, as indicated by a two-dot chain line in FIG. 16. That is, by supplying the common electrode COM with an optimum common electrode voltage by taking the drop ΔV of the pixel voltage PXV into consideration, it is possible to drive the liquid crystals substantially on an alternating current.

When the bias voltage Vcom applied to the common electrode COM is deviated from the optimum common electrode voltage, a difference occurs in the voltage Vlc applied to the liquid crystals during the period of positive polarity and the period of negative polarity in the AC drive of the liquid crystals, and a periodic change in the brightness produces a flickering in the display, thereby deteriorating the quality of the display to a conspicuous degree.

<Operation of the Holding Capacitor Element>

In FIG. 15, Cgs is a parasitic capacity formed between the gate electrode and the source electrode of the thin-film transistor TFT. The dielectric of the parasitic capacity Cgs is an interlayer insulating film formed between the gate electrode and the source electrode. Cpix is a liquid crystal capacitor formed between the transparent pixel electrode PIX and the common transparent pixel electrode COM. The dielectric film of the liquid crystal capacitor Cpix includes liquid crystals and an orientation film. Vlc is a voltage applied to the liquid crystals. The holding capacitor element Cadd has the effect that the pixel electrode potential PXV is little affected by a change ΔVG in the potential of the scanning signal when the thin-film transistor TFT is switched. This is expressed by the following formula (1), $$\Delta V = \{C_{gs}/(C_{gs}+C_{ds1}+C_{ds2}+C_{add}+C_{pix})\} \times \Delta VG \quad (1)$$

where ΔV is a drop component in the pixel voltage PXV due to a change ΔVG in the potential of the scanning signal described earlier. The drop component ΔV becomes the source of a DC component applied to the liquid crystals. The drop component ΔV in the pixel voltage PXV decreases with an increase in the holding capacity Cadd. The holding capacitor element Cadd further works to lengthen the discharge time and stores the video data for an extended period of time after the thin-film transistor TFT is turned off. A decrease in the DC component applied to the liquid crystals contributes to lengthen the life of the liquid crystals and makes it possible to decrease the so called printing effect in which the preceding image remains when the picture displayed by the liquid crystals is changed over.

In FIG. 15 and formula 1, symbol Cds1 denotes a parasitic capacity between the source electrode SD1 and the drain electrode SD2 of the thin-film transistor, which is also a capacity between the pixel electrode PIX and the drain signal line Di. Symbol Cds2 denotes a parasitic capacity between the pixel electrode PIX and the neighboring drain signal line Di+1, and Cgd denotes a parasitic capacity between the gate electrode and the drain electrode.

Referring to FIG. 3, the gate electrode GL is formed in a large size so as to cover the i-type semiconductor layer AS and, hence, overlaps an increased area on the source electrode SD1 and the drain electrode SD2, resulting in an increase in the parasitic capacity Cgs. Therefore, the pixel electrode potential PXV tends to be easily affected by the scanning signal VG. However, provision of the holding capacitor element Cadd causes the pixel electrode potential PXV to be little affected by the parasitic capacity Cgs. In this embodiment, the pixel has a capacity of about 150 fF. By taking the writing characteristics into consideration, therefore, the capacity of the holding capacitor element Cadd is set to be about 100 fF. Since the parasitic capacity Cgs is about 15 fF, the capacity of the holding capacitor element Cadd is more than 6 times as great as the parasitic capacity Cgs.

Figure 12:
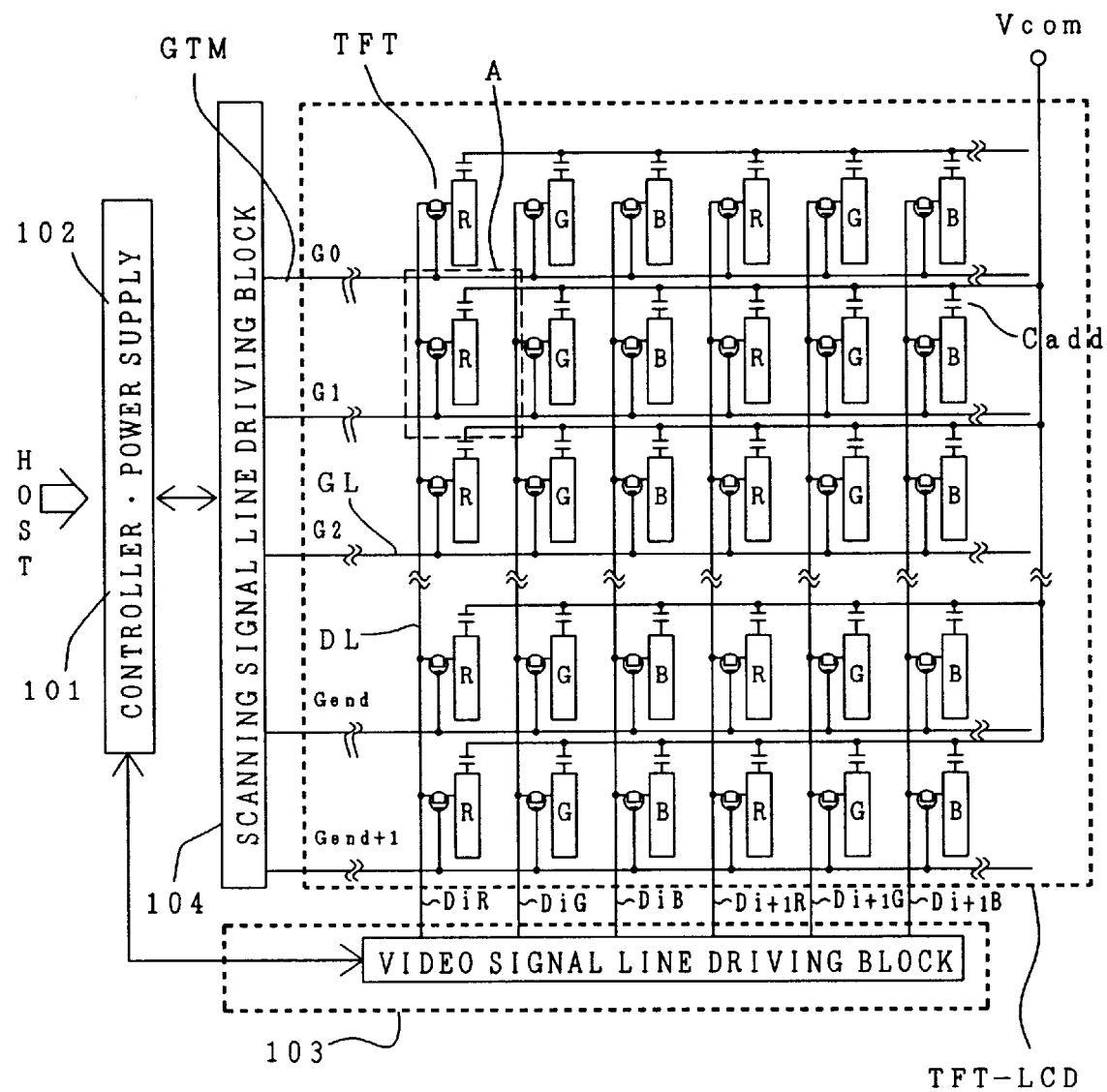
FIG. 12 is an equivalent circuit diagram of the liquid crystal display device according to the embodiment of FIG. 11.
Figure 13:
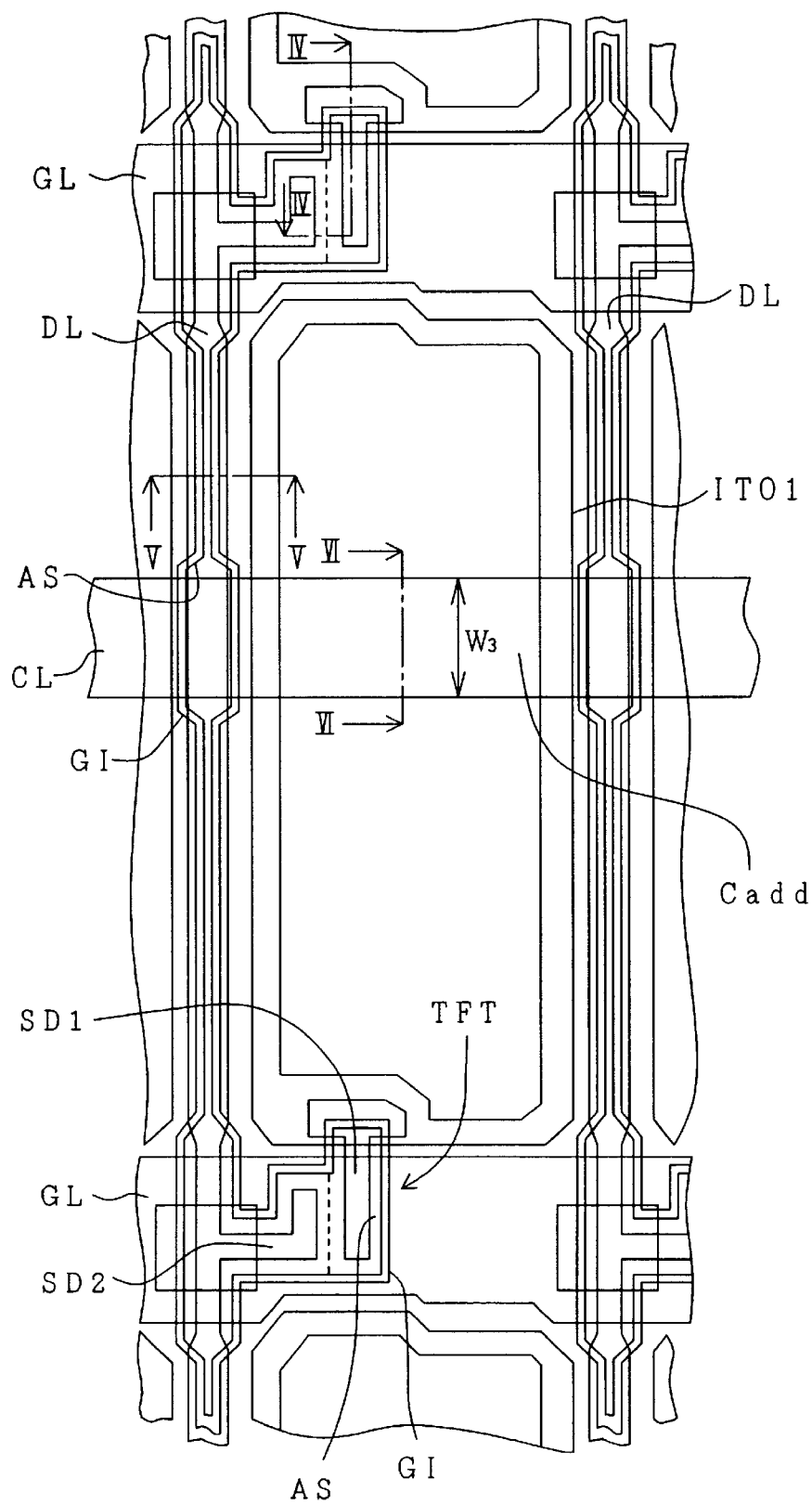
FIG. 13 is a plan view illustrating a pixel region of the liquid crystal display device according to a further embodiment of the present invention.
Figure 14:
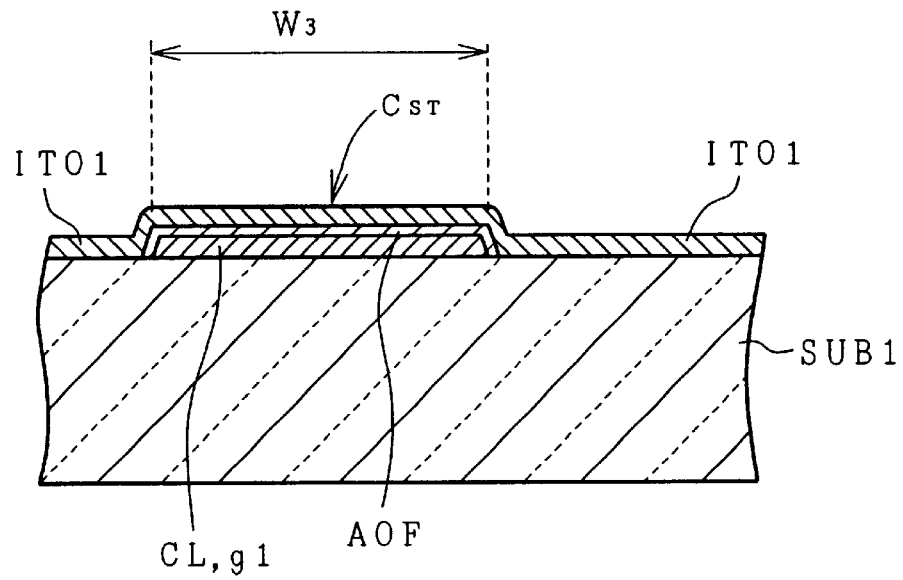
FIG. 14 is a sectional view taken along the line VI—VI of FIG. 13.

In FIGS. 2, 3 and 6, part of the gate signal line GL of the neighboring pixel is superposed on the pixel electrode ITO1 via an insulating film thereby to form the holding capacity Cadd, which is an additional capacitor. However, the holding capacity Cadd is in no way limited thereto, but may be of the accumulated capacitor type in which, as shown in FIGS. 12, 13 and 14, the holding capacity Cadd is formed by forming a capacity line CL separately from the gate signal line GL, and superposing the capacity line CL and the pixel electrode ITO1 one upon the other via an insulating film. The additional capacitor type in this embodiment has the advantage of increasing the numerical aperture and the disadvantage of an increased distributed capacity due to the gate signal line GL. In this embodiment, furthermore, the accumulated capacitor type has a the advantage of decreasing the distributed capacity of the gate signal line GL and the disadvantage of a decrease in the numerical aperture due to the provision of the capacity line CL and an increase in the number of the steps.

<Countermeasure against the Dispersion in the Parasitic Capacity Cgs>

So far, the display region of the liquid crystal display device under consideration was not larger than a 10-type (diagonal size of 25.4 cm). Therefore, dispersion due to the fabrication was small for the parasitic capacity Cgs between the gate electrode and the source electrode, and an optimum common electrode voltage Vcom applied to the common electrode COM was determined exclusively. However, as the display region of the liquid crystal display device becomes greater than 13-type (diagonal size of 34 cm), dispersion in the parasitic capacity Cgs due to the fabrication increases, and the optimum common electrode voltage Vcom given to the common electrode COM greatly varies depending upon the portions of the display region and can no longer be exclusively determined.

Figure 1:
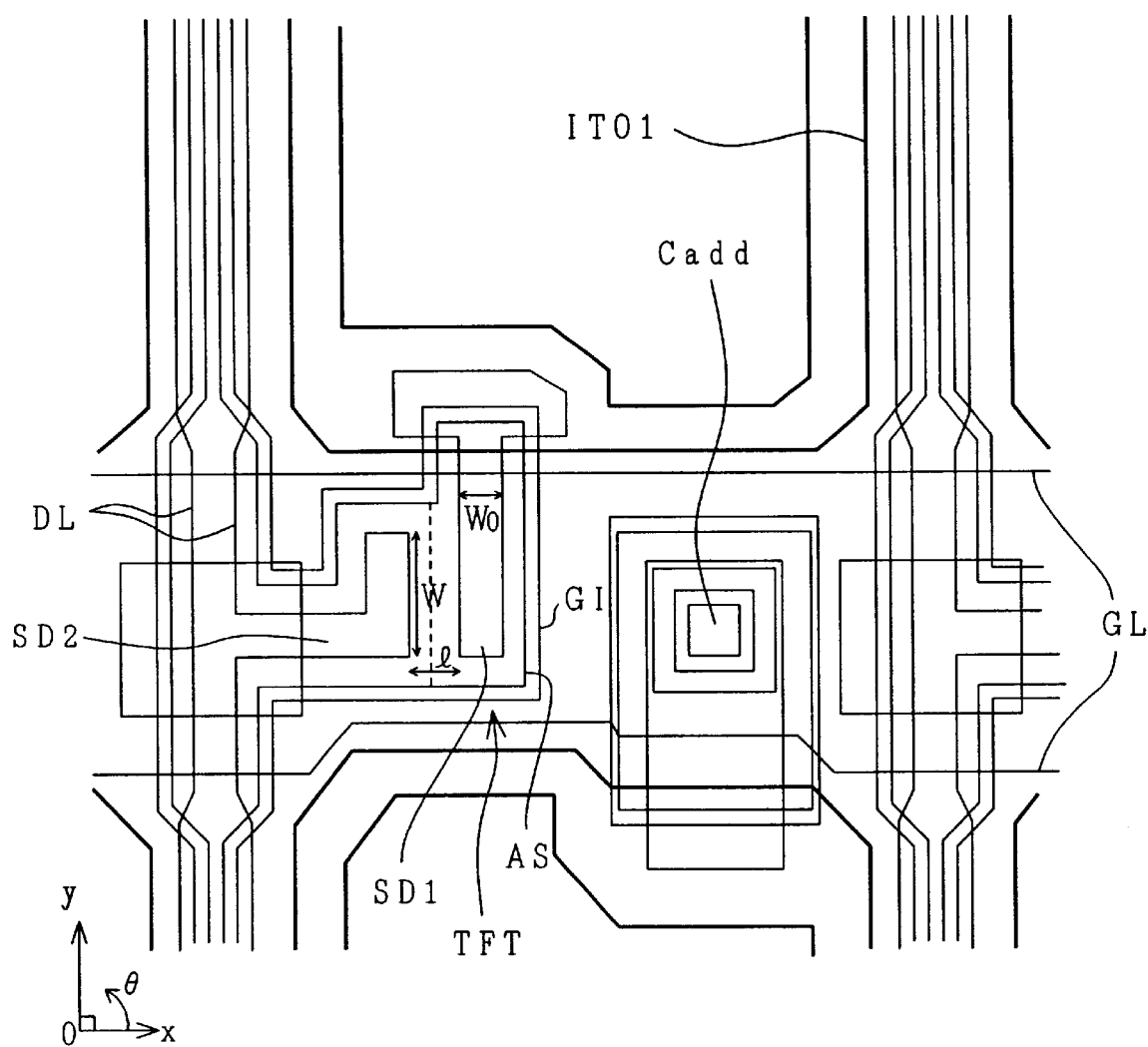
FIG. 1 is a plan view illustrating a major portion of a liquid crystal display device according to an embodiment of the present invention.

In order to solve the above-mentioned problem in this embodiment, as shown in FIG. 1, the source electrode SD1 of the thin-film transistor TFT is formed so as to have a width smaller than the channel width W of the thin-film transistor in a portion where it is connected to the pixel electrode ITO1 and where it shifts from a portion of which is superposed on the gate electrode to a portion of which is no longer superposed thereon. That is, as seen in FIG. 1, the drain electrode SD2 extends on the gate signal line GL in a direction in which it runs from the drain signal line D1 and is bent to be directed toward the pixel electrode ITO1. In this case, what substantially works as the drain electrode SD2 is the portion bent toward the pixel electrode ITO1, and its length determines the channel width W of the thin-film transistor TFT. The source electrode SD1 is disposed so as to be opposed to the bent portion of the drain electrode SD2, is separated therefrom by a length corresponding to the channel length 1, and extends toward the pixel electrode ITO1 so as to be connected to the pixel electrode ITO1. Therefore, the length of the side of the drain electrode SD2 opposed to the source electrode SD1 becomes the channel width. Here, the width $W_0$ of the source electrode SD1 in a direction at right angles with the direction in which it extends is smaller than the channel width W.

Despite the thus constituted construction in which the source electrode SD1 is formed so as to be deviated in position, for example, in the y-direction in the drawing, the area of the source electrode SD1 superposed on the gate signal line GL does not change so much. This is because the source electrode SD1 has the width $W_0$ which is relatively small in a direction at right angles with the direction in which it extends. When deviated in position in the x-direction in the drawing, there is no change in the area of the source electrode SD1 superposed on the gate signal line GL. Therefore, even when deviated in position in a rotational direction θ, there is no great change in the area of the source electrode SD1 superposed on the gate signal line GL. Therefore, the capacity Cgs between the gate electrode and the source electrode is formed nearly uniformly in the thin-film transistor TFT in each pixel region, and the occurrence of flickering is suppressed.

Figure 8:
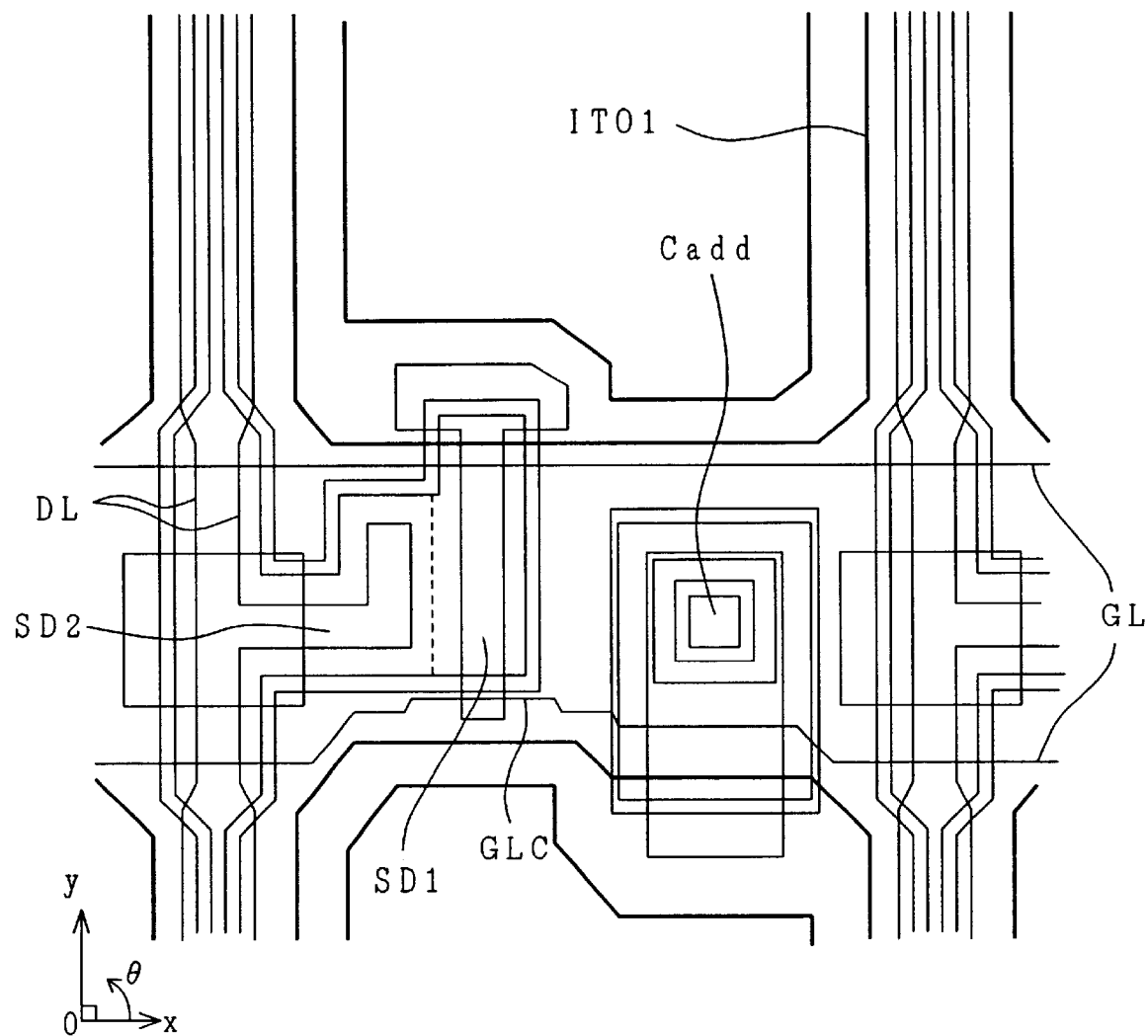
FIG. 8 is a plan view of the liquid crystal display device according to another embodiment of the present invention.

The above-mentioned effect is obtained not only by the drain electrode SD2 and the source electrode SD1 having patterns as shown in FIG. 1, but also by the patterns shown, for example, in FIGS. 7(a) to 7(d). In the above-mentioned embodiment, in this case, the source electrode SD1 is formed symmetrically to the drain electrode SD2 except for a portion where it extends so as to be connected to the pixel electrode ITO1. As shown in FIG. 8, however, the source electrode SD1 may be extended in a direction opposite to the pixel electrode ITO1 to which it is connected, beyond the gate signal line GL as a matter of course. In this case, the gate signal line GL is partly cut away as denoted by GLC so that the source electrode SD1 will ride over the gate signal line GL without being connected to the pixel electrode ITO1 of the neighboring pixel region. In other words, the source electrode SD1, formed integrally with another portion that is not substantially working as an electrode, is permitted to intersect the gate signal line GL.

The thus constituted source electrode DS1 does not at all undergo a change in the area where it is superposed on the gate signal line GL despite the source electrode SD1 is deviated in position in the x-direction or in the y-direction while it is being formed. Accordingly, even when the source electrode SD1 is deviated in position in a rotational direction θ, there is no change in the area where the source electrode SD1 is superposed on the gate signal line GL. In other words, the capacity Cgs between the gate electrode and the source electrode is uniformly formed in the thin-film transistor TFT in each pixel region, and the occurrence of flickering is suppressed to a large extent.

In this embodiment, furthermore, the capacity Cgs between the gate electrode (gate signal line GL) and the source electrode SD1 is small on the input terminal side of the gate signal line and is large on the end side thereof in each of the thin-film transistors TFT arranged along the gate signal line GL.

FIG. 9(a) illustrates a thin-film transistor on the input terminal side of the gate signal line GL and FIG. 9(b) illustrates a thin-film transistor of the end side of the gate signal line GL. As will be obvious from FIGS. 9(a) and 9(b), the semiconductor layer AS on the side of the source electrode SD1 of the thin-film transistor shown in FIG. 9(b) (an extra portion is denoted by symbol I) is larger than that shown in FIG. 9(a), so that the thin-film transistor TFT on the end will have an increased capacity Cgs between the gate signal line GL and the source electrode SD1. That is, the area where the semiconductor layer AS near the source electrode is superposed on the gate signal line GL in the thin-film transistor of the end side, is larger than the area where the semiconductor layer AS near the source electrode is superposed on the gate signal line GL in the thin-film transistor on the input terminal side.

Here, the thin-film transistors TFT may be so constituted as to have a capacity Cgs that gradually increases from the input terminal side toward the end of the gate signal line GL or a plurality of neighboring thin-film transistors may be formed in groups and the capacity Cgs may be gradually increased after each of the groups. Based on this constitution, the shift of potential of the pixel electrode ITO1 toward the positive direction due to a distorted waveform of a scanning signal on the gate signal line GL can be canceled by the shift of potential of the pixel electrode ITO1 toward the negative direction caused by the jumping voltage through the capacity Cgs. Thus, an equal voltage is applied to the liquid crystals from the input terminal side to the end side of the gate signal line GL. It is therefore made possible to suppress flickering on the screen caused by a change in the brightness.

In general, the writing time of one line in the liquid crystal panel is completed within a time determined by the width of the "TFT-on signal" from the scanning signal line driving block 104. However, the TFT-on signal is a rectangular pulse, the width of which is exclusively determined by the frequency of horizontal scanning. With a rectangular pulse, in general, the current greatly changes (di/dt) at the time of rise or break and is subject to be affected by a time constant in the signal passage. Therefore, the waveform, in practice, rises or breaks along a curve of the time constant (hereinafter, the curved waveform is referred to as a "distorted waveform", and the waveform having a large curvature is referred to as a "greatly distorted waveform"). Besides, the distortion in the waveform increases toward the end of the signal passage. Accordingly, a component of voltage drop ΔV in the pixel voltage PXV decreases toward the end of the scanning signal line, and, as a result, the pixel voltage (source electrode voltage) becomes higher toward the end with respect to the input terminal side of the scanning signal line.

This problem becomes conspicuous particularly when the number of pixels is increased or when the screen size (particularly, in the direction of scanning lines) is increased. The distributed capacity (Cgs, Cadd, Cgd, etc.) in FIG. 15 increases in proportion to the number of the pixels or the size of the screen.

Figure 17:
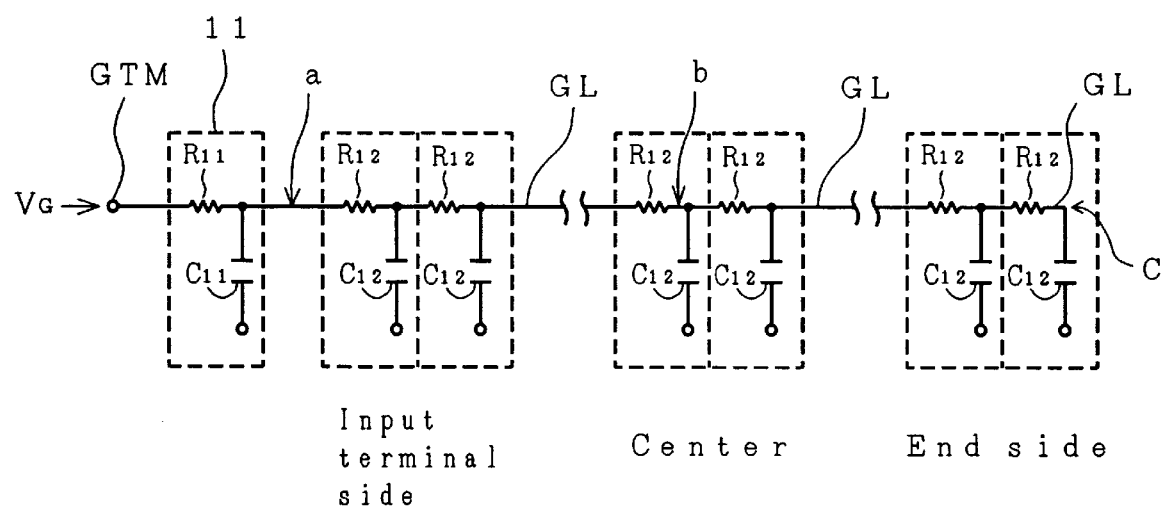
FIG. 17 is an equivalent circuit diagram of a line of the liquid crystal display panel.

The above-mentioned problem will now be described more specifically. FIG. 17 is an equivalent circuit diagram of a line of the liquid crystal display panel. In FIG. 17, symbol GTM denotes an input terminal of a TFT-on signal (i.e., a terminal connected to the output of the scanning signal line driving block 104 of FIG. 2). The terminal GTM is connected to the gate signal line GL of the liquid crystal display panel through a wiring 11 between the scanning signal line driving block 104 and the liquid crystal display panel Symbols R11 and C11 denote a resistance component and a capacity component of the wiring 11, respectively. The gate signal line GL is equalized in a unit of a pixel, and R12 and C12 denote a resistance component and a capacitor component (also referred to as distributed capacity and corresponds to Cgs+Cadd+Cgd), respectively, of each pixel.

Now, attention will be given to two points a and c on the gate signal line GI, and the distorted waveform of the TFT-on signal is considered at these points. The point a is closest to the terminal GTM. The TFT-on signal at the point a is conveniently denoted by VGa. The point c is remotest from the terminal GTM (in other words, at an end of the scanning signal line). The TFT-on signal at the point c is conveniently denoted by VGc.

FIG. 18(a) is a diagram illustrating a drive waveform of the TFT on the terminal side of the line, FIG. 18(b) is a diagram illustrating a drive waveform of the TFT at the center of the line, and FIG. 18(c) is a diagram illustrating a drive waveform of the TFT at the end of the line. These signals VGa and VGc are rectangular pulses that rise and break within a predetermined writing period Tx allocated within a horizontal scanning period. The waveform of the signal VGa is distorted very little due to a time constant of R11 and C11, but the waveform of the signal VGc is greatly distorted due to a time constant of R11 and C11 inclusive of R12 and C12 of a line of pixels. Therefore, the signal VGc breaks as denoted by tfr so as to be considerably delayed behind the break tfl of the signal VGa. The degree of delay increases with an increase in the number of pixels or with an increase in the size of the screen. This is because, the distributed capacity (i.e., C12) increases. That is, there exists a relationship tfr >tfl and the difference varies chiefly depending upon the magnitude of the distributed capacity. From the relationship of the above-mentioned formula 1, therefore, a component of voltage drop ΔVl of the pixel voltage of the terminal side becomes greater than a drop component of the voltage drop ΔVr of the pixel voltage at the end of the line.

So far, it was accepted practice to provide a design such that the parasitic capacity (Cgs, Cds1, Cds2) and the holding capacity (Cadd) were constant at any place on the display region in order to equalize the drive conditions of the pixel electrode. According to the prior art, therefore, the above-mentioned optimum common electrode voltage Vcom differed between the terminal side and the end of the gate signal line GL. However, the size of the display screen was not larger than 10-type (15 cm high and 21 cm wide) and the gate signal lines GL were not so long (not longer than 21 cm). Therefore, the difference in the component of voltage drop ΔV of the pixel voltage was negligibly small between a pixel of the input terminal side and a pixel of the end of the line, and, besides, the liquid crystal display device possessed a drive margin (particularly, margin in the optimum common electrode voltage Vcom), and so the problem that the invention is to solve was not recognized. With the prior art, therefore, it is no longer possible to apply an optimum voltage to the common electrode for all pixels on the display region when there are an increased number of pixels along the line or when the gate signal lines become long on the display region (a liquid crystal display device in which the gate signal lines are not at least shorter than 27 cm).

In order to solve the above-mentioned problem, according to the above-mentioned embodiment, the size of the semiconductor layer AS on the side of the source electrode SD1 of the thin-film transistor TFT was adjusted in order to change the capacity Cgs. According to the above-mentioned embodiment, furthermore, the size of the semiconductor layer AS was adjusted in a portion other than the channel-formic region (region between the source electrode SD1 and the drain electrode SD2) of the thin-film transistor. Despite the capacity Cgs between the gate and the source being changed depending upon the pixel being on the input terminal side or the end of the line, therefore, the size of the TFT (the channel length 1 and the channel width W) is not changed, and the design of the liquid crystal display device is facilitated.

As will be obvious from the above-mentioned formula 1, furthermore, the method of adjusting the component of voltage drop ΔV of the pixel voltage so that the difference is minimized among the pixels is not limited to the method of adjusting the capacity Cgs between the gate and the source employed by the above-mentioned embodiment, but may involve a method of adjusting the holding capacitor element Cadd, a method of adjusting the liquid crystal capacity Cpix (the area of the pixel electrode ITO1 or the distance between the pixel is electrode ITO1 and the common electrode COM (not shown)), a method of adjusting the capacity Cds1 between the source and the drain, or a method of adjusting the parasitic capacity Cds2 between the pixel electrode ITO1 and the neighboring drain signal line D1.

However, the above-mentioned embodiment, which calls for adjusting the capacity Cgs between the gate and the source, makes it possible to adjust the component of voltage drop ΔV of the pixel voltage over a wide dynamic range relying upon a small amount of change in the capacity Cgs between the gate and the source, as will be obvious from the fact that the numerator of the formula is constituted by the capacity CGS between the gate and the source only. According to the above-mentioned embodiment, therefore, a small space is required for changing the capacity Cgs between the gate and the source, making it possible to increase the numerical aperture of the pixel. Moreover, when the capacity Cgs between the gate and the source, the holding capacitor element Cadd, the liquid crystal capacity Cpix, the capacity Cds1 between the source and the drain, and the capacity Cds2 between the pixel electrode and the drain signal line, are adjusted in combination, it is possible to adjust the component of voltage drop ΔV of the pixel voltage over a wider dynamic range.

When the component of voltage drop ΔV of the pixel voltage is to be adjusted relying upon the holding capacitor element Cadd, the liquid crystal capacity cpix, the capacity Cds1 between the source and the drain or the capacity Cds2 between the pixel electrode and the drain signal line, as seen from formula (1) in which the capacities constitute the denominator, it is recommended that the capacity be decreased in the pixels (c) at the end of the line where the drive waveform of the scanning signal tends to increase and that the capacity be increased in the pixels (a) on the input terminal side where the drive waveform of the scanning signal is substantially not distorted.

The method of adjusting the capacity Cgs between the gate and the source is not limited to the method of adjusting the area where the semiconductor layer AS is superposed on the gate signal line GL The same effect can be obtained even when a protuberance GLP is formed, as shown in FIG. 10, on the gate signal line GL in the region where the source electrode SD1 is superposed on the gate signal line GL, the protuberance GLP having a decreased area on the input terminal side of the gate signal line GL and having an increased area at the end of the line.

Figure 11:
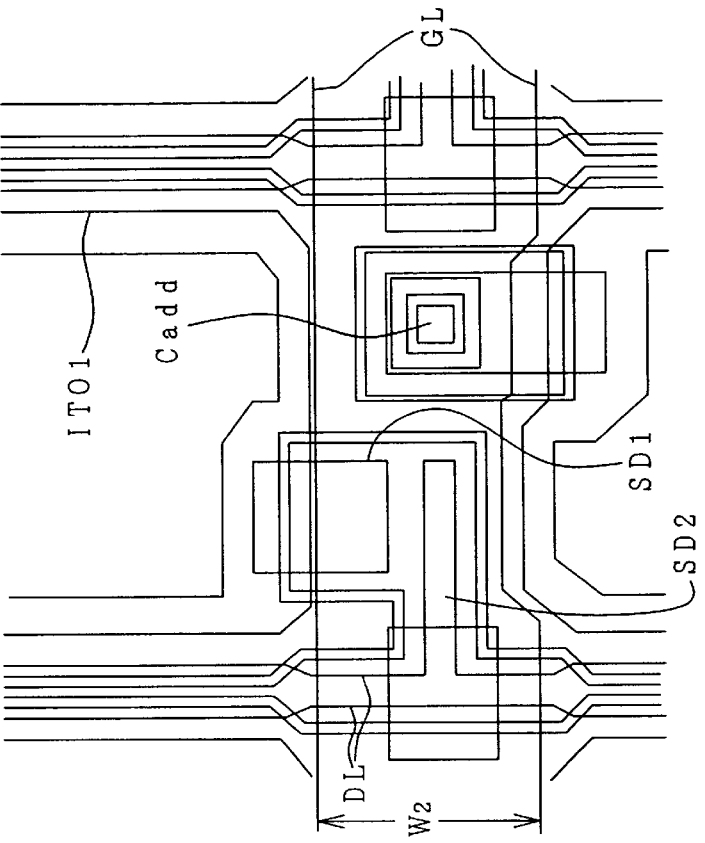
FIGS. 11(a) and 11(b) are plan views illustrating the liquid crystal display device according to a yet further embodiment of the present invention.
Figure 11:
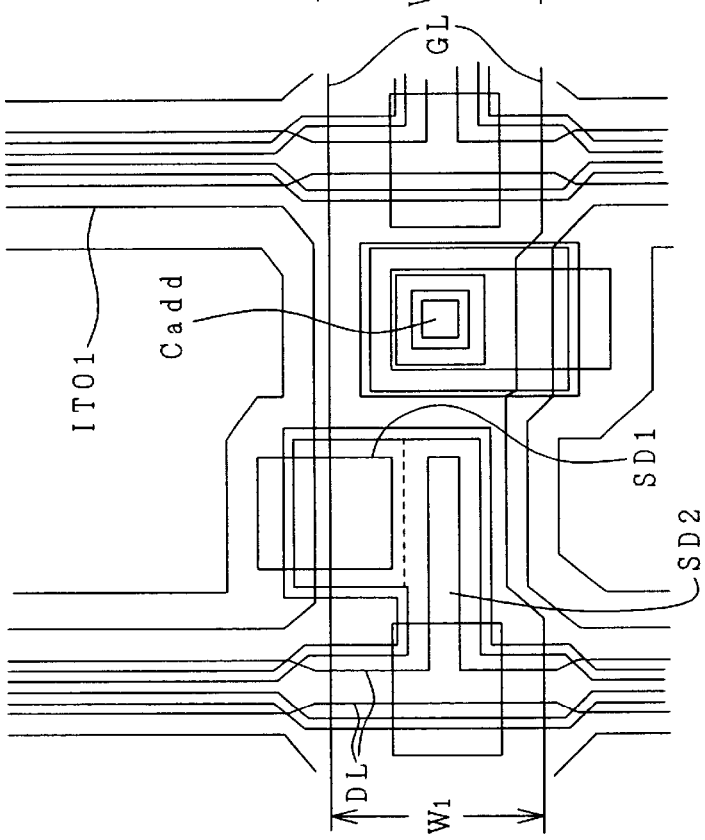

As shown in FIG. 11, furthermore, the region where the source electrode SD1 is superposed on the gate signal line GL may be adjusted by changing the length of the gate signal line GL in the direction of width. That is, a plurality of neighboring pixel regions arranged along the gate signal line GL are grouped, and the width of the gate signal line GL is successively broadened after each of the groups from the input terminal side toward the end thereof (the width of the source electrode SD1 of the side connected to the pixel electrode ITO1 is broadened).

In the case of a liquid crystal display device in which an accumulated capacitor type is employed for the holding capacitor Cadd shown in FIGS. 12, 13 and 14, the area where the capacity line CL is superposed on the pixel electrode ITO1 is successively broadened from the input terminal side toward the end of the line, in order to adjust the component of voltage drop ΔV of the pixel voltage. In the embodiment shown in FIGS. 13 and 14, the width W3 of the capacity line CL is adjusted to adjust the component ΔV in the potential drop. The liquid crystal display device of the accumulated capacitor type has a small distributed capacity in the gate signal line GL, which makes it possible to decrease the effect of the distorted waveform of the scanning signal VG. The liquid crystal display device of the accumulated capacitor type, however, makes it possible to decrease the difference in the voltage drop component ΔV between the input terminal side and the end of the line by adjusting the capacity Cgs between the gate and by the source and adjusting the holding capacity Cadd as in the above-mentioned embodiment, to quite eliminate the effect of distorted waveform of the scanning signal VG, and, hence, t realize a display screen of the greatest class.

The distortion in the signal waveform input to the gate signal line GL monotonously increases from the input terminal toward the end.

Figure 18:
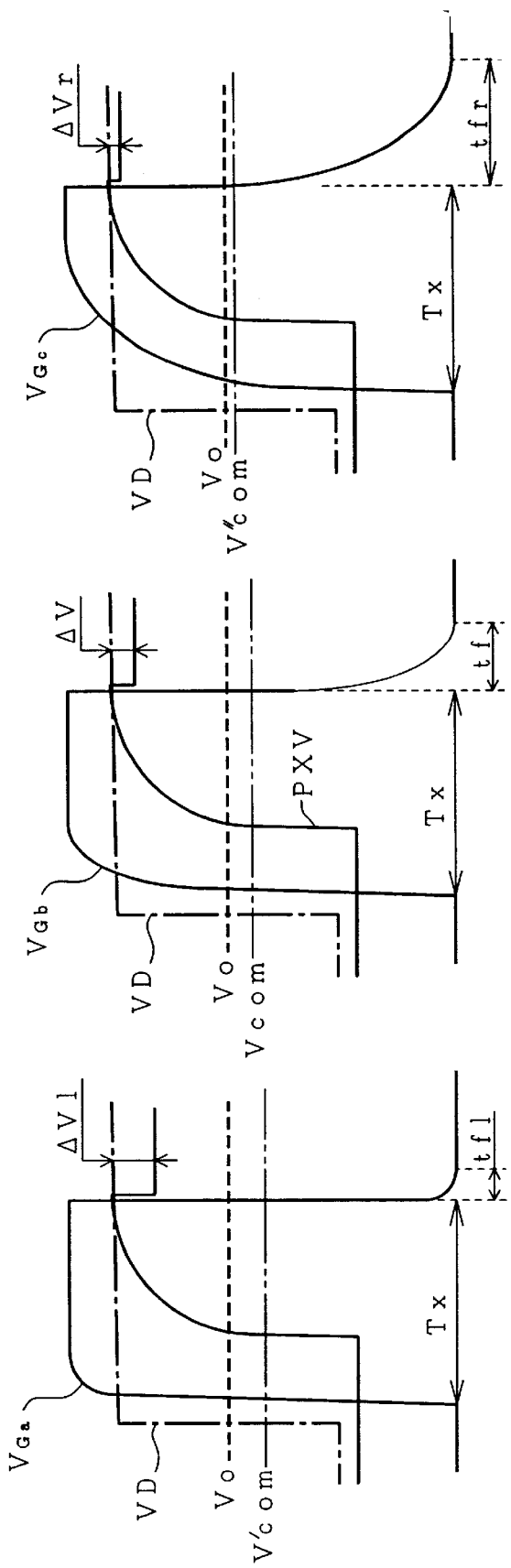
FIG. 18(a) is a diagram of a drive waveform of a thin-film transistor TFT of a pixel on the terminal side.
FIG. 18(b) is a diagram of a drive waveform of a thin-film transistor TFT of a pixel on the central portion.
FIG. 18(c) is a diagram of a drive waveform of a thin-film transistor TFT of a pixel on the end side.

The portion b in FIG. 17 represents the center of the gate signal line (scanning signal line) GL, and the TFT driving waveform for this portion is shown in FIG. 18(*b*). FIG. 18(*a*) shows the TFT driving waveform on the side of the input terminal denoted by a in FIG. 17, and FIG. 18(*c*) shows the TFT driving waveform at the end denoted by c in FIG. 17. As will be obvious from a comparison of FIGS. 18(*a*), 18(*b*) and 18(*c*), a breaking time tf of the scanning signal VGb at the center lies between a breaking time tfl at the input terminal side and a breaking time tfr at the end of the line. That is, there is a relationship tfl<tf<tfr. In the conventional liquid crystal display device, which is so designed that the parasitic capacity becomes equal in all pixels, a potential drop component ΔV of the pixel electrode at the center lies between a potential drop component ΔVl of the input terminal side and the potential drop component ΔVr of the output terminal side. That is, there is a relationship ΔVl>ΔV>ΔVr.

Accordingly, the voltage of the pixel electrode ITO corresponding to the central portion of the gate signal line GL is shifted toward the positive direction in an amount larger than that of the pixel electrode ITO corresponding to the input terminal of the gate signal line GL, but smaller than that of the pixel electrode ITO corresponding to the end of the gate signal line GL.

Accordingly, the capacity Cgs between the gate electrode and the source electrode SD1 of the thin-film transistor TFT connected to the central portion of the gate signal line GL is set to be larger than the capacity Cgs of the thin-film transistor TFT connected to the input terminal of the gate signal line GL but is set to be smaller than the capacity CGS of the thin-film transistor TFT connected to the end of the gate signal line GL, so that the gate signals jumping into the pixel electrodes ITO at the input terminal and at the end of the line and those jumping into the pixel electrode ITO at the center will have a uniform leakage component, that the optimum common electrode voltage does not differ depending upon the pixels at the input terminal at the end and at the center, and that no flickering occurs at the center of the display region.

The pixel electrodes ITO1 at the input terminal and at the end of the gate signal line have been discussed in connection with the pixel electrode ITO1 that contributes to obtaining a display, but the pixel electrodes ITO1 that d0 not contribute to obtaining a display, such as the pixel electrode ITO1 shielded by a light-shielding film and the pixel electrodes of the unfinished pixels, have not been considered since they are irrelevant to the flickering problem. However, the light-shielded pixel electrodes ITO1 at the input terminal and at the end of the gate signal line may be furnished with some means for increasing the capacity Cgs of the thin-film transistor TFT on the end of the line compared to the capacity Cgs of the shun-film transistor TFT of the input terminal side, so that no DC component is added to the liquid crystals, enabling the life of the liquid crystals to be lengthened.

This embodiment has dealt with a liquid crystal display device which is furnished with a countermeasure for preventing flickering caused by a distortion in the waveform of the scanning signals input to the gate signal line GL and with a countermeasure for preventing flickering caused by a deviation in position of the source electrode SD1 due to distortion in the optical system of the exposure device. However, the device may be furnished with either one of these countermeasures, as a matter of course.

When the liquid crystal display device, which has already been furnished with a countermeasure for preventing flickering caused by deviation in position of the source electrode SD1, is further furnished with a countermeasure for preventing flickering caused by a distortion in the waveform of scanning signals input to the gate signal line GL, however, the potential drop component ΔV of the pixel electrode can be adjusted to maintain a high precision, and a sufficient drive margin of the liquid crystal display panel (particularly, margin of the common electrode voltage Vcom) can be maintained even when the display region is expanded to the greatest degree. <Method of fabricating a transparent substrate SUB1>FIGS. 19 to 21 show a method of fabricating a first transparent insulating substrate (thin-film transistor substrate) SUB1 of the liquid crystal display device shown in FIG. 3. In these drawings, the flow diagram at the center identifies the sequential steps, the left side shows the changes in structure of the thin-film transistor TFT (cross section along IV—IV) at each step and the right side shows the changes in structure of the holding capacitor Cadd (cross section along VI—VI) as viewed in cross section at each step. Except for the steps B an D, the steps A to G are sectionalized to correspond to each of the photo processings. Sectional views of the steps show steps after the photo processing is finished and after the photoresist is removed. The photo processings involve a series of operations from when the photoresist is applied through the selective exposure to light by using a mask up to the developing stage. The sectionalized steps will be described hereinafter.

Step A, FIG. 19.

A silicon oxide film SIO is applied by dipping to both surfaces of a first transparent insulating substrate of a 7059 glass (trade name), followed by baking at 500° C. for 60 minutes. The SIO film is formed for decreasing the surface ruggedness of the transparent insulating film SUB1. The SIO film, however, may not be formed when the degree of ruggedness is small. A first conducting film gl of Al-Ta, Al-Ti-Ta, Al-Pd or the like having a thickness of 2800 Å is formed by sputtering. After the photo processing, the first conducting film gl is selectively etched with a mixed acid solution of phosphoric acid, nitric acid and glacial acetic acid.

Step B, FIG. 19.

After the resist is directly drawn (after the anodic oxidation pattern is formed), the substrate SUB1 is immersed in an anodic oxidizing solution in which 3% tartaric acid is adjusted for its PH to 6.25±0.05 with ammonia, the solution being diluted with an ethylene glycol solution to a 1:9 proportion, and the current density is adjusted to be 0.5 mA/cm$^2$ (constant current formation). Next, the anodic oxidation (anodic formation) is effected until a voltage of 125 V is reached, which is necessary for forming a predetermined Al203 film having a predetermined thickness. It is desired that this state is maintained for several tens of minutes (constant-voltage formation). This is important for obtaining a uniform Al203 film. Therefore, the conducting film gl is anodically oxidized, and an anodically oxidized film AOF having a thickness of 1800 Å is formed on the scanning signal line (gate line) GL and on the side surfaces in a self-aligned manner, thereby to form a portion of the gate insulating film of the thin-film transistor TFT.

Step C, FIG. 19.

A conducting ITO film having a film thickness of 1400 Å is formed by sputtering. After the photo processing, the conducting film ITO is selectively etched with an etching solution, which is a mixed acid solution of hydrochloric acid and nitric acid, in order to form one electrode of the holding capacitor Cadd and the transparent pixel electrode ITO1.

Step D, FIG. 20.

An ammonia gas, a silane gas and a nitrogen gas are introduced into a plasma CVD apparatus to form a silicon nitride film having a thickness of 2000 Å. A silane gas and a hydrogen gas are introduced into the plasma CVD apparatus to form an i-type amorphous silicon film having a thickness of 2000 angstroms. Then, a hydrogen gas and a phosphine gas are introduced into the plasma CVD apparatus to form an N$^+$-type amorphous silicon film d0 having a thickness of 300 Å. The films are continuously formed in the same CVD apparatus by changing the reaction chambers.

Step E, FIG. 20.

After the photo processing, SF$_6$ and BCl are used as dry-etching gases to etch the N±-type amorphous silicon film do and the i-type amorphous silicon film AS Then, by using SF$_6$, the silicon nitride film GI is etched. It is of course allowable to continuously etch the N$_+$-type amorphous silicon film d0, i-type amorphous silicon film AS and silicon nitride film GI with the SF$_6$ gas.

Thus, the CVD films of three layers are continuously etched with gases comprising chiefly SF$_6$ to taper the side walls of the i-type amorphous silicon film AS and the silicon nitride film GI. Owing to the tapered shape, the probability of breaking the lines is greatly decreased even when the source electrode SD1 is formed thereon. The N$_+$-type amorphous silicon film d0 is tapered at an angle close to 90 degrees. However, the thickness is as small as 300 Å, and the probability of breakage of the line due to this step is very small. Therefore, the plane patterns of the N$_+$-type amorphous silicon film d0, i-type amorphous silicon film AS and silicon nitride film GI are not the same patterns, but are tapered in cross section. Therefore, the patterns increase in the order of N$_+$-type amorphous silicon film d0, i-type amorphous silicon film AS and silicon nitride film GI.

Step F, FIG. 21.

A first conducting film di of chromium having a thickness of 600 Å is formed by sputtering. After the photo processing, the first conducting film d1 is etched with an ammonium ceric nitrate solution to form a drain signal line DL, a source electrode SD1 and a drain electrode SD2.

In this embodiment, as shown in the step E, the N$_+$-type amorphous silicon film d0, i-type amorphous silicon film AS and silicon nitride film GI are tapered. Therefore, the source electrode SD1 is not broken despite the fact that it is formed only of the first conducting film d1.

Next, SF$_6$ and BCl are introduced into the dry-etching apparatus to etch the N$_+$-type amorphous silicon film d0 in order to selectively remove the N$_+$-type semiconductor film d0 between the source and the drain.

Step G, FIG. 21.

An ammonia gas, a silane gas and a nitrogen gas are introduced into the plasma CVD apparatus to form a silicon nitride film having a thickness of 0.6 μm. After the photo processing, SF$_6$ is used as the dry-etching gas to form a protection film PSV1. As the protection film, there can be used not only the SiN film formed by the CVD process, but also a film composed of an organic material <Designing the Photomask>

Figure 22:
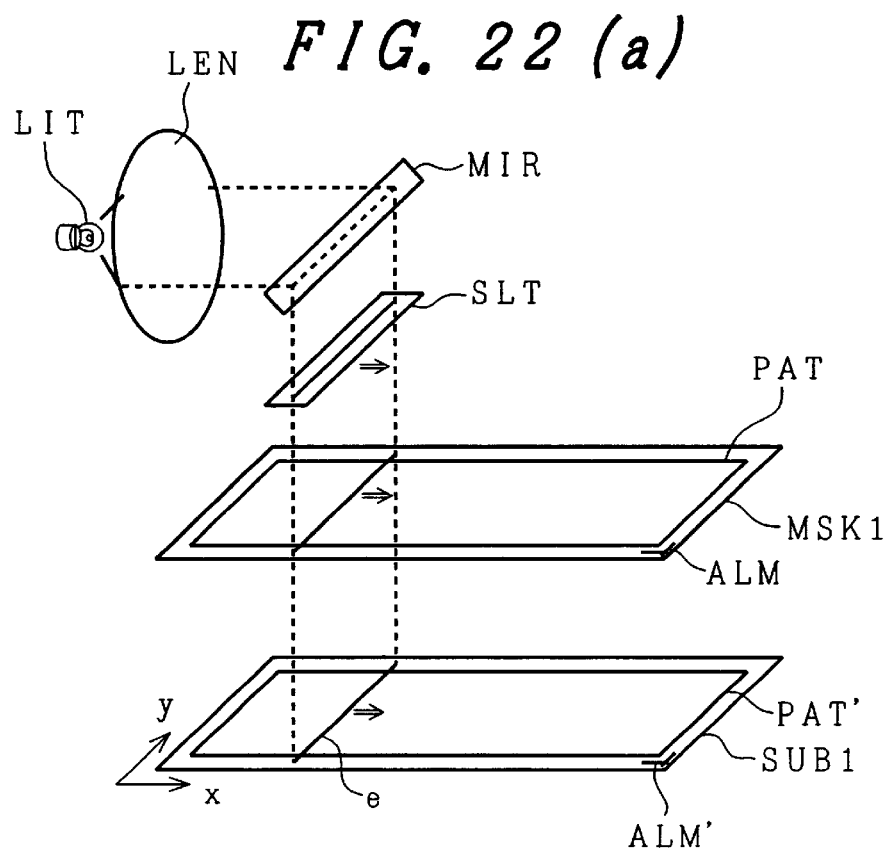
FIG. 22(a) is a diagram illustrating a method of forming a pattern on the thin-film transistor substrate SUB1 by photolithography.
FIG. 22(b) is a diagram illustrating a pattern of a photomask.
Figure 22:
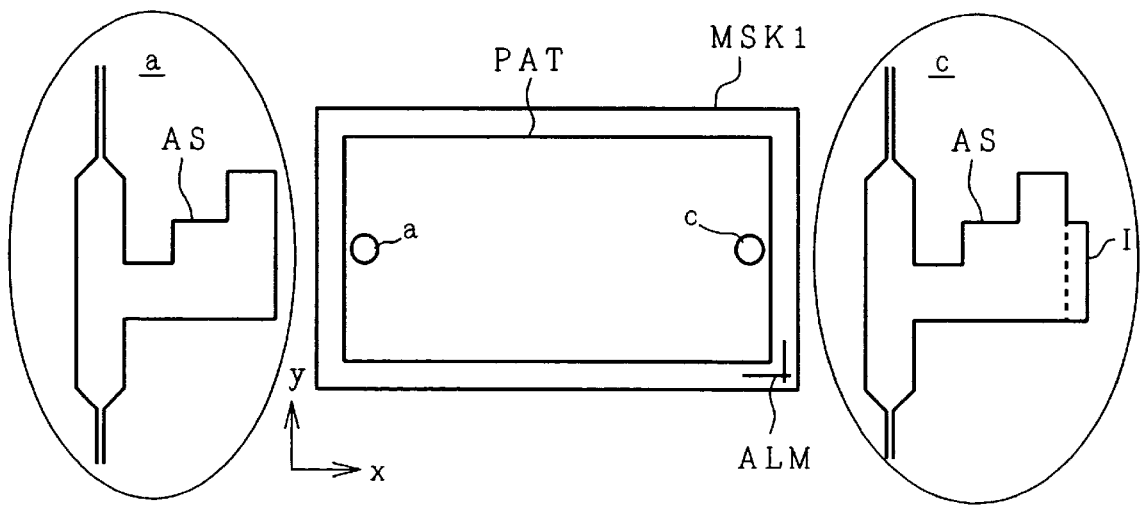

The patterns of the layers of the first substrate SUB1 are formed by photolithography. FIG. 22(a) is a diagram illustrating a method of these forming patterns. Symbol MSK1 denotes a photomask in which is formed a pattern PAT that will be transferred onto the substrate. In the photomask MSK1 are formed all patterns of a layer of the liquid crystal display panel. Symbol SUB1 denotes a substrate on which a photoresist is applied to the main surface. In FIG. 22(a), a pattern of a liquid crystal display panel is formed on one substrate SUB1. It is, however, also allowable to form patterns of a plurality of liquid crystal display panels on one mother glass substrate.

The photomask has an alignment mark ALM, and the alignment mark ALM' formed on the first substrate SUB1 and the alignment mark ALM on the photomask are brought into alignment, so that they are aligned. Light, such as ultraviolet rays, generated by a source of light LIT, such as a mercury lamp, is formed into a uniform plane source of light through a lens optical system LEN and is sent to a reflector MIR. Light directed to the reflector MIR is reflected toward a slit SLT. Light that has passed through the slit SLT is formed into a linear beam to illuminate the photomask MSK1. The linear beam that has passed through the photomask MSK1 falls on the substrate SUB1 to sensitize the photoresist. In this case, the pattern PAT of the photomask MSK1 is transferred onto the substrate SUB1 only at a portion e where light is falling. The slit SLT and the reflector MIR are moved in a direction indicated by an arrow in FIG. 22(a) relative to the substrate and the photomask, whereby the pattern PAT of the photomask MSK1 is transferred as a pattern PAT' of the substrate SUB1.

FIG. 22(b) illustrates a pattern PAT of the photomask MSK1 used in the method shown in FIG. 22(a). If based on the embodiment shown in FIG. 9, the photomask MSK shown in FIG. 22(b) forms a pattern of the semiconductor layer AS. Since the gate signal line GL extends in the x-direction, the portion a in FIG. 22(b) represents the pattern of the semiconductor layer AS on the input terminal side, and the portion b represents the pattern of the semiconductor layer AS on the end of the line. The portion I of FIG. 22(b) represents a pattern for adjusting the capacity Cgs between the gate and the source, as mentioned earlier.

According to the method in which the whole pattern of a layer of the liquid crystal display panel is formed on the photomask MSK1 to pattern a desired layer (e.g., semiconductor layer AS) of the substrate SUB1 shown in FIGS. 22(a) and 22(b), the pattern is formed on the input terminal side and on the end side under the same exposure conditions, making it possible to highly precisely form the pattern I for adjusting the potential drop component $\Delta V$ of the pixel electrode. It is, therefore, made possible to precisely control the potential drop component $\Delta V$ and to improve the margin (particularly, margin in the common electrode voltage Vcom) in driving the liquid crystal display panel.

Referring to FIG. 22(a), the pattern PAT' is formed on the substrate SUB1 by exposure to light while moving the reflector MIR and the slit SLT. Therefore, the pattern PAT' on the substrate is often deviated depending upon the precision of the mechanical portion. However, when the width $W_0$ of the source electrode SD1 in a direction at right angles with the direction in which it extends is selected to be smaller than the channel width W as shown in FIGS. 1, 7(a) to 7(d) and 8, variation in the capacity Cgs between the gate and the source due to deviation between the source electrode SD1 and the gate signal line GL decreases, and the effect of deviation can be minimized in the light exposure step.

Figure 23:
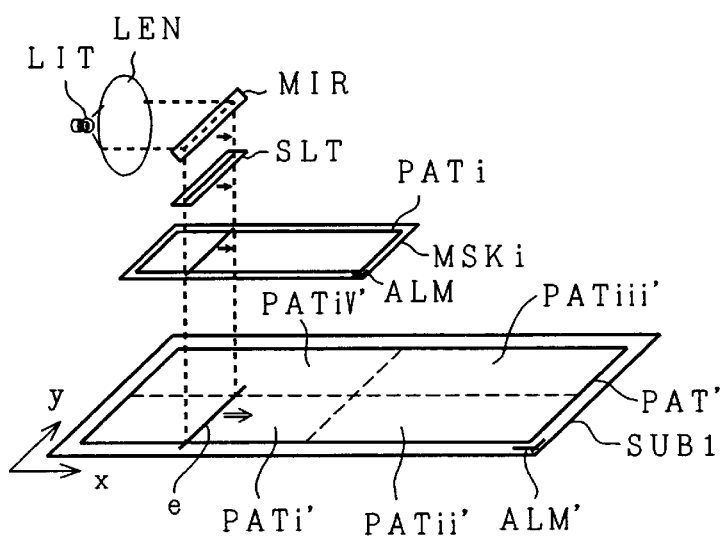
FIG. 23(a) is a diagram illustrating another method of forming a pattern on the thin-film transistor substrate SUB1 by photolithography.
FIG. 23(b) is a diagram illustrating another pattern of the photomask.
Figure 23:
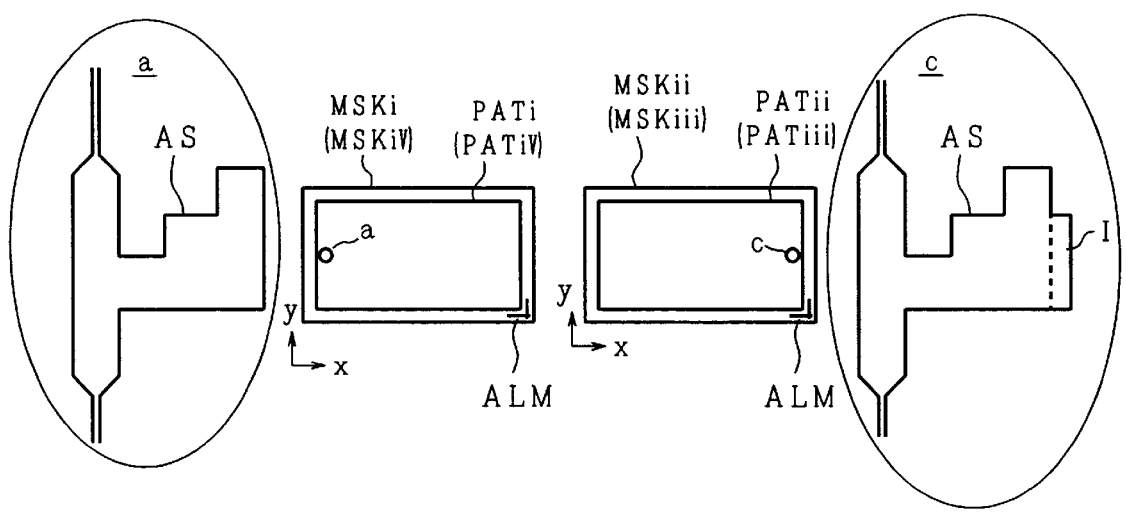

FIG. 23(a) illustrates another method of forming a pattern on the first substrate SUB1. The difference from FIG. 22(a) is that the pattern PAT' on the substrate SUB1 is divided into a plurality of block patterns PATi, PATii, PATiii and PATiv, and respective photomasks MSKi, MSKii, MSKiii and MSKiv are used for every block.

FIG. 23(b) illustrates patterns of a plurality of photomasks MSKi, MSKii, MSKiii and MSKiv used for the method of FIG. 23(a). If based on the embodiment shown in FIG. 9, FIG. 23(b) illustrates a photomask of the semiconductor layer AS. Since the gate signal line GL extends in the x-direction, the photomasks MSKi and MSKiv are located on the input terminal side, and the photomasks MSKii and MSKiii are located on the end side. Furthermore, the portion a in FIG. 23(b) represents the pattern of the semiconductor layer AS on the input terminal side, and the portion b represents the pattern of the semiconductor layer AS on the end side. The part I of FIG. 23(b) is a pattern for adjusting the capacitance Cgs between the gate and source, as described before. The points that are not specifically described here are the same as those of the embodiment described above with reference to FIGS. 22(a) and 22(b).

According to the embodiment shown in FIG. 23(a), the pattern PAT' of a layer of a liquid crystal display device is formed by a plurality of photomasks MSKi, MSKii, MSKiii and MSKiv, making it possible to fabricate a liquid crystal display device having a large display screen. According to the embodiment shown in FIG. 23(a), however, the pattern I for adjusting the potential drop component $\Delta V$ must be formed using different photomasks depending upon whether the processing is on the input terminal side or the end, making it difficult to adjust the potential drop component $\Delta V$ while maintaining high precision. In the embodiment shown in FIG. 23(a), furthermore, the exposure to light takes place a plurality of times with the exposures being overlapped in the boundary regions among the block patterns PATi', PATii', PATiii' and PATiv' of the substrate SUB1, and the patterns become narrower than in other portions. Therefore, it becomes necessary to provide a pattern I for adjusting the potential drop component $\Delta V$ on portions other than the portions that are subjected to the exposure to light a plurality of times.

In the embodiment shown in FIG. 22(a), on the other hand, the whole pattern PAT' of a layer of the liquid crystal display device is formed by a piece of photomask MSK1. Therefore, there is no boundary region and no pattern I needs be formed for adjusting the potential drop component $\Delta V$. In fabricating a liquid crystal display device having a display region of the largest class, however, the method shown in FIG. 23(a) is suited, provided no consideration is given to the pattern I for adjusting the potential drop component $\Delta V$.

The method of forming the pattern shown in FIGS. 22(a) and 22(b) or FIGS. 23(a) and 23(b), is to form a pattern I on the semiconductor layer AS in order to adjust the potential drop component $\Delta V$. It is of course allowable to provide any other layer with the pattern I for adjusting the potential drop component $\Delta V$. In the embodiment shown in FIGS. 10 and 11, for example, a method of forming the pattern shown in FIGS. 22(b) and 22(b) or FIGS. 23(a) and 23(b) may be applied to the photomask in the step (first photo) of forming the gate signal line GL It is also allowable to employ the method of forming the pattern shown in FIGS. 22(a) and 22(b) or FIGS. 23(a) and 23(b) for the photomask used in the step (fourth photo) for forming the source electrode SD1.

<When the Gate Signal Lines GL are to be Driven from Both Ends>

Figure 24:
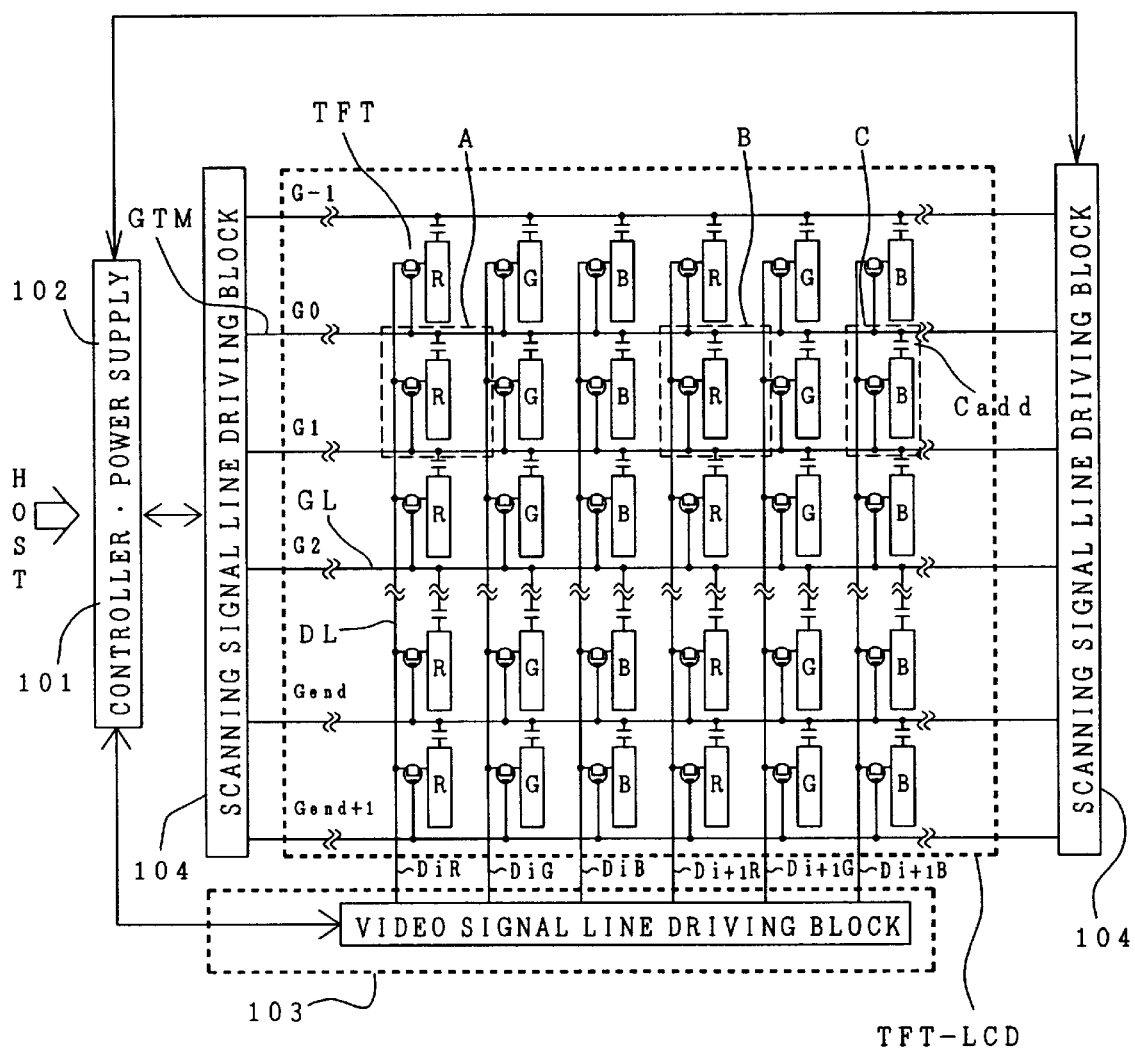
FIG. 24 is an equivalent circuit diagram of a liquid crystal display device according to another embodiment in which scanning signal line driving blocks 104 are provided at both the right and left ends of the gate signal lines.

FIG. 24 is an equivalent circuit of a liquid crystal display device in which scanning signal line driving blocks 104 are provided at both the right and left ends of the gate signal lines GL in order to decrease the distortion in the scanning signal line drive waveform VG. In the liquid crystal display device shown in FIG. 24, the gate signal lines GL have no free end. However, even in the liquid crystal display device of the constitution shown in FIG. 24, however, the waveform of the scanning signal VG at the central pixel B remote from the two scanning signal line driving blocks 104 is more distorted than the waveform of the scanning signal VG at the pixels A and C near the two scanning signal line driving blocks 104. In the liquid crystal display device which is driven from both sides, as shown in FIG. 24, therefore, the capacity Cgs between the gate and the source of the pixel B remote from the input terminal is selected to be larger than the capacity Cgs between the gate and the source of the pixels A and C close to the input terminals, in order to decrease the difference in the potential drop component $\Delta V$ of the pixel electrode caused by a distortion in the waveform of the scanning signal VG. The specific method of adjusting the capacity Cgs between the gate and the source is as described in connection with the embodiment shown in FIGS. 9, 10 and 11.

In the liquid crystal display device driven from both sides, as shown in FIG. 24, the method of decreasing the difference in the potential drop component $\Delta V$ of the pixel electrode is not limited to adjusting the capacity Cgs between the gate and the source, but may be attained by adjusting the holding capacity Cadd, the liquid crystal capacity Cpix, the capacity Cds1 between the source and the drain or the capacity Cds2 between the pixel electrode and the drain signal line. The embodiments described above have dealt with a reversed stagger structure used, for example, to provide a configuration, such as the order of the gate electrode, the semiconductor layer, and the source/drain electrode. The present invention is also available for a stagger structure in which its up-and-down relationship or the order of formation is reversed relative to the former.

Embodiment 2

The first embodiment of the present invention has dealt with a liquid crystal display device of the so-called vertical electric field type. However, the features of the present invention are applicable even to a device of the lateral electric-field type (in-plane switching type) in which a pair of opposing electrodes are provided on the surface of one transparent substrate of the liquid crystal side, and an electric field is established between the electrodes in parallel with the transparent substrate. Thus, the present invention can also be adapted to the liquid crystal display device of the in-plane switching type.

Figure 25:
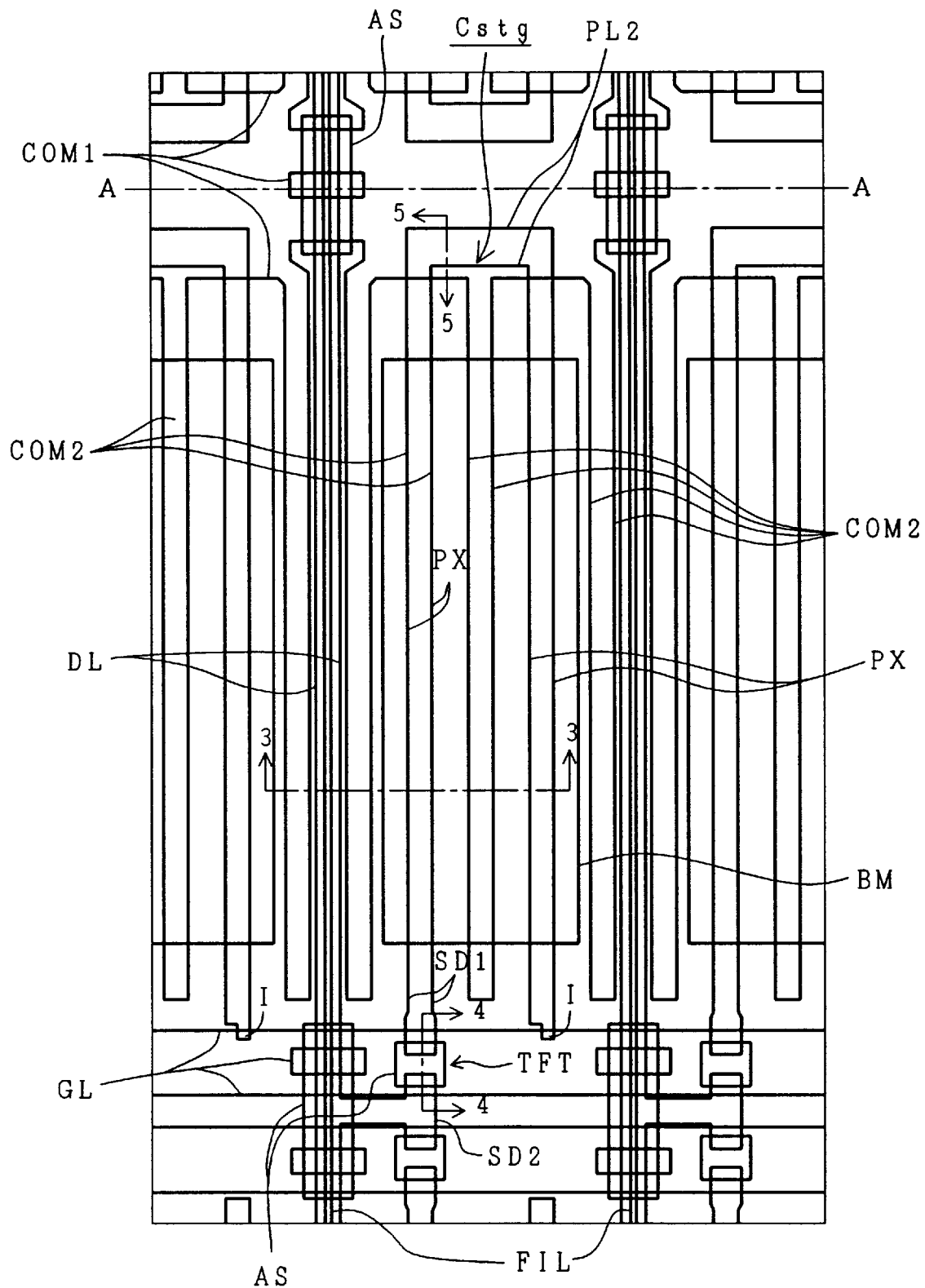
FIG. 25 is a plan view of a unit pixel of an active matrix liquid crystal display device of the in-plane switching transverse electric field type to which the present invention is applied.
Figure 26:
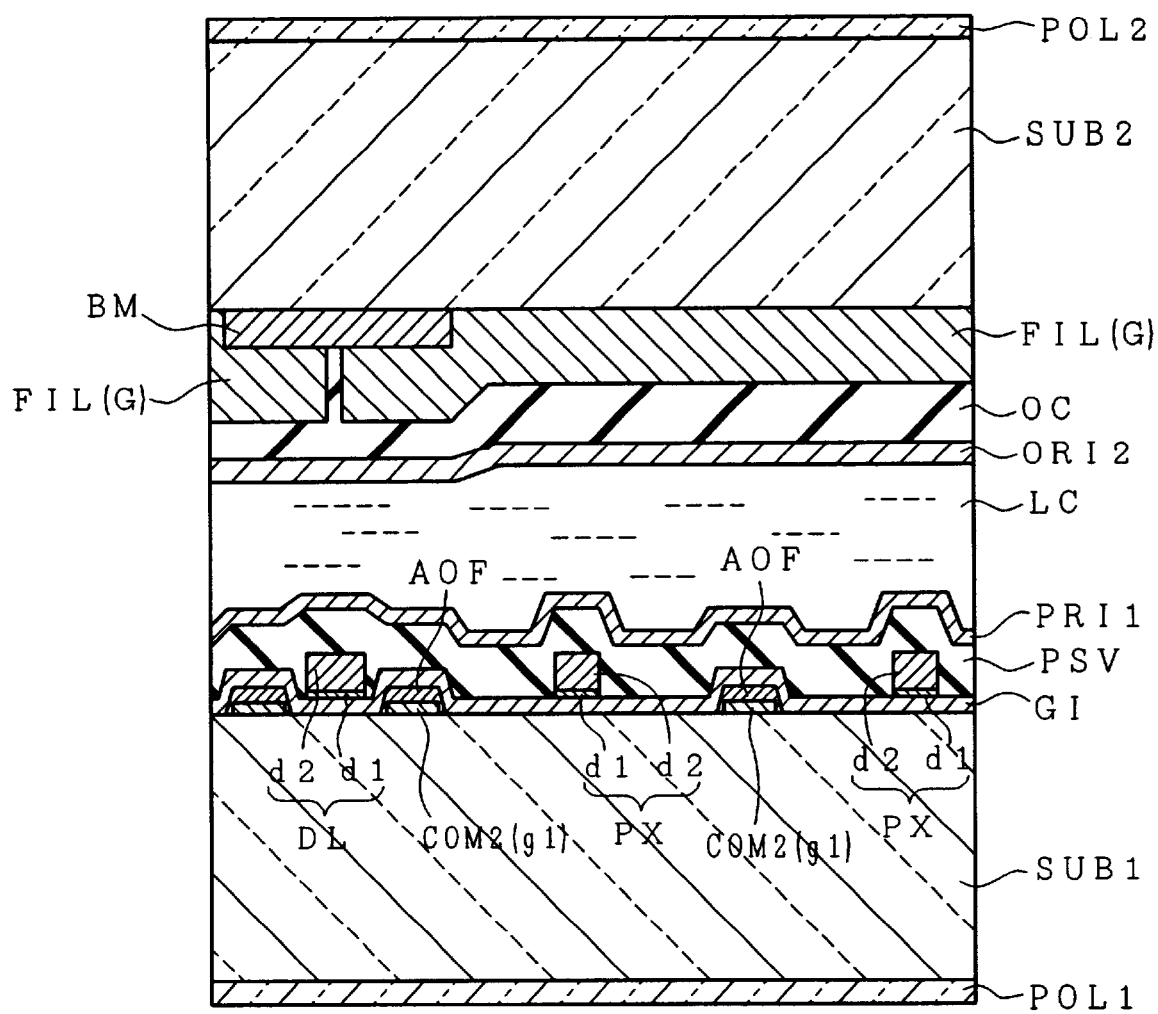
FIG. 26 is a sectional view taken along the line 3—3 of FIG. 25.

FIG. 25 is a plan view illustrating a pixel in the active matrix color liquid crystal display device of the in-plane switching type to which the present invention is applied and the periphery thereof. FIG. 26 is a sectional view taken along the line 3—3 in FIG. 25. As shown in FIGS. 25 and 26, a thin-film-transistor TFT, a capacitor Cstg, a pixel electrode PX and an opposing electrode COM2 are formed on the lower transparent glass substrate SUB1 with the liquid crystal layer LC as a reference, and a color filter FIL and a black matrix pattern BM for shielding light are formed on the upper transparent glass substrate SUB2. Furthermore, on the inner sides (liquid crystal LC sides) of the transparent glass substrates SUB1, SUB2 are formed orientation films ORI1 and OR12 for controlling the initial orientation of the liquid crystals, and on the outer sides of the transparent glass substrates SUB1, SUB2 are provided (cross-Nicol arranged) polarizer plates with their optical axes at right angles to each other.

Referring to FIG. 25, each pixel is arranged in a region surrounded by a gate signal line (scanning signal line or horizontal signal line) GL, an opposing voltage signal line (common electrode wiring) COM1, and two neighboring drain signal lines (video signal lines or vertical signal lines) D1 (e.g., arranged in a region surrounded by four signal lines). Each pixel includes a thin-film transistor TFT, a capacitor Cstg, a pixel electrode PX and an opposing electrode COM2. The gate signal lines GL and the opposing voltage signal lines COM1 extend in the right-and-left direction in the drawing, and are arranged in a plural number in the up-and-down direction. The drain signal lines D1 extend in the up-and-down direction and are arranged in a plural number in the right-and-left direction. The pixel electrode PX is connected to the thin-film transistor TFT; and the electrode COM2 is formed integrally with the voltage signal line COM1.

The two pixels neighboring each other in up and down directions along the drain signal line D1 have plane constitutions that are superposed one upon the other when folded along the line A in FIG. 25. This makes it possible to use the opposing voltage signal line COM1 in common in the two pixels extending on either side along the drain signal line D1, and to lower the resistance of the opposing voltage signal line COM1 by increasing the width of the electrode of the opposing voltage signal line COM1. This makes it easy to apply an opposing voltage to the opposing electrodes of the pixels in the right-and-left direction to a sufficient degree from the external circuit.

The pixel electrode PX and the electrode COM2 are opposed to each other, and an optical state of the liquid crystals LC is controlled in accordance with an electric field between the pixel electrode PX and the electrode COM2 thereby to control the display. The pixel electrodes PX and the electrodes COM2 are formed lace comb teeth, and have narrow widths running in the up-and-down direction in FIG. 25. The gate signal line GL has a sufficient width to be capable of applying a sufficient degree of scanning voltage to the gate electrode GT at the ha pixel of the end of the line. The opposing voltage signal line COM1, too, has a sufficient width to be capable of applying a sufficient degree of voltage to the electrode COM2 of the pixel at the end of the line.

In FIG. 25, a portion denoted by symbol I is provided to adjust the potential drop component $\Delta V$ of the pixel electrode. The portion indicated by symbol I is formed integrally with the pixel electrode PX and is superposed on the gate signal line GL via an insulating film GI to constitute a capacity Cgs between the gate and the source. In the embodiment shown in FIG. 25, therefore, the area of a portion, where the gate signal line GL is superposed on the pattern I for adjusting the capacity between the gate and the source, is selected to be small in the pixel on the side close to the input terminal and is selected to be large in the pixel on the side remote from the input terminal in order to decrease the difference in the potential drop component $\Delta V$ of the pixel electrode among the pixels.

The liquid crystal display device of the in-plane switching type has a feature of wide viewing angle characteristics. Therefore, by employing in-plane switching for the liquid crystal display device having a large display region, it is possible to solve the problem inherent in the prior art in that part of the screen which cannot be seen normally in the conventional display device due to narrow viewing angle characteristics. By applying the present invention to the liquid crystal display device of the in-plane switching type, therefore, the effect of distortion in the driving waveform can be decreased, the distortion being caused by an increase in the length of the gate signal lines GL, and, hence, a liquid crystal display device having a display region of the greatest class can be realized.

In the liquid crystal display device of the in-plane switching type, too, the method of adjusting the potential drop component $\Delta V$ of the pixel electrode is not limited to adjusting the capacitance Cgs between the gate and the source, but instead, the holding capacity Cadd, the liquid crystal capacity Cpix, the capacity Cds1 between the source and the drain or the capacity Cds2 between the pixel electrode and the drain signal line may be adjusted.

Embodiment 3

Figure 27A:
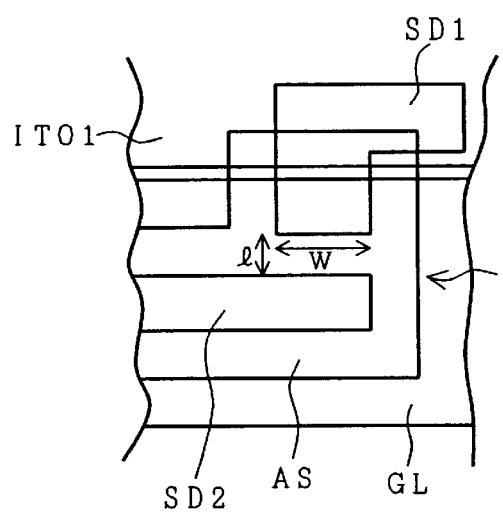
FIGS. 27(a) and 27(b) are plan views illustrating a major portion of a pixel of the liquid crystal display device according to another embodiment of the present invention.
Figure 27B:
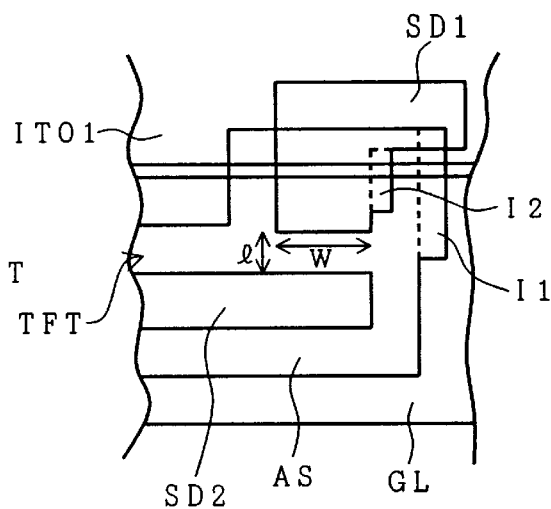

FIGS. 27(a) and 27(b) show a further embodiment for adjusting the capacity Cgs between the gate and the source. FIGS. 27(a) and 27(b) are plan views of a pixel shown in FIG. 3 in the proximity of the thin-film transistor. The portions not shown in FIGS. 27(a) and 27(b) have the same constitution as the constitution of the pixel shown in FIG. 3. FIG. 27(a) shows the constitution of the thin-film transistor TFT in a pixel of the input terminal side, and FIG. 27(b) shows the constitution of the thin-film transistor TFT at the side remote from the input terminal.

In this embodiment, the channel 1 of the thin-film transistor TFT is lengthened in a direction perpendicular to a direction in which the gate signal line GL extends. In addition, the capacity Cgs between the gate and the source is adjusted by two portions, i.e., by the adjusting pattern I1 formed on the semiconductor layer AS and by the adjusting pattern I2 formed on the source electrode SD1, in order to decrease the difference in the potential drop component ΔV of the pixel electrode among the pixels. In this embodiment, therefore, the adjusting pattern I1 and the adjusting pattern I2 are provided in narrow regions to increase the numerical aperture in the pixels.

In this embodiment, as shown in FIGS. 27(a) and 27(b), furthermore, the adjusting pattern I2 formed on the source electrode SD1 is separated from a portion that defines the channel length 1 and the channel width W of the thin-film transistor TFT. Therefore, provision of the adjusting pattern I2 on the source electrode SD does not cause any change in the driving ability of the thin-film transistor TFT.

Embodiment 4

Figure 28A:
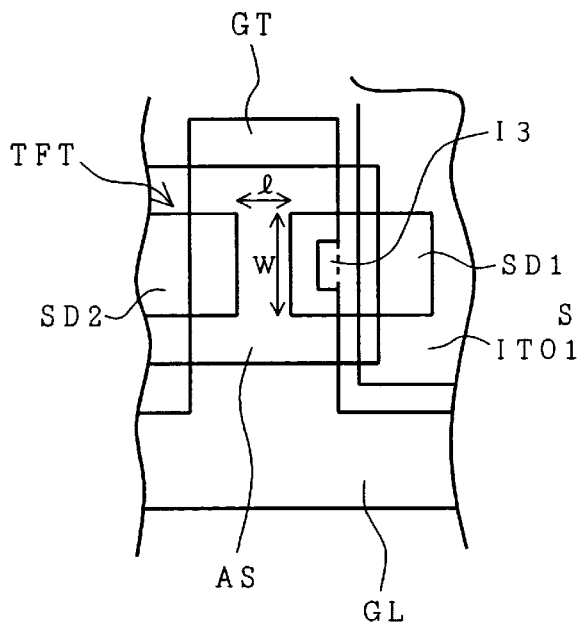
FIGS. 28(a) and 28(b) are plan views illustrating a major portion of a pixel of the liquid crystal display device according to a further embodiment of the present invention.
Figure 28B:
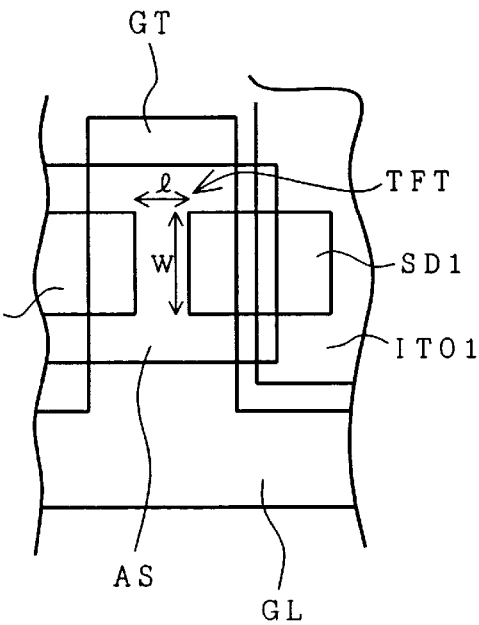

FIGS. 28(a) and 28(b) illustrate a still further embodiment for adjusting the capacity Cgs between the gate and the source. FIGS. 28(a) and 28(b) are plan views of the pixel shown in FIG. 3 in the proximity of the thin-film transistor. The portions that are not shown in FIGS. 28(a) and 28(b) have the same constitution as that of the pixel shown in FIG. 3. FIG. 28(a) shows the constitution of the thin-film transistor TFT of the pixel on the input terminal side, and FIG. 28(b) shows the constitution of the thin-film transistor TFT of the side remote from the input terminal.

In this embodiment, the gate electrode GT of the thin-film transistor TFT is branched from the gate signal line GL. A cut-away pattern I3 is formed on a portion of the gate electrode GT of the thin-film transistor TFT superposed on the source electrode SD1 to adjust the capacity Cgs between the gate and the source and to decrease the difference in the potential drop component ΔV of the pixel electrode among the pixels. Therefore, this embodiment does not sacrifice the numerical aperture, unlike the case where a protuberance is formed on the gate electrode GT of a light-shielding metal film.

In order to decrease the difference in the potential drop component ΔV of the pixel electrode caused by a distortion in the waveform of the scanning signal relying upon the cut-away pattern I3 formed in the gate electrode GT shown in FIGS. 28(a) and 28(b), the pixels closer to the input terminal should have a cut-away pattern I3 of increasing amounts.

In the embodiment shown in FIGS. 28(a) and 28(b), furthermore, the adjusting pattern I3 is formed in the gate electrode GT separated from the portion that defines the channel length 1 and the channel width W of the thin-film transistor TFT. Therefore, provision of the adjusting pattern I3 on the gate electrode GT does not cause any change in the driving ability of the thin-film transistor TFT.

Embodiment 5

In this embodiment, a liquid crystal display device having an increased numerical aperture in the pixels is provided with a countermeasure for decreasing the difference in the potential drop component ΔV of the pixel electrode caused by a distortion in the waveform of the scanning signal.
<Constitution of the Pixel Region>

Figure 29:
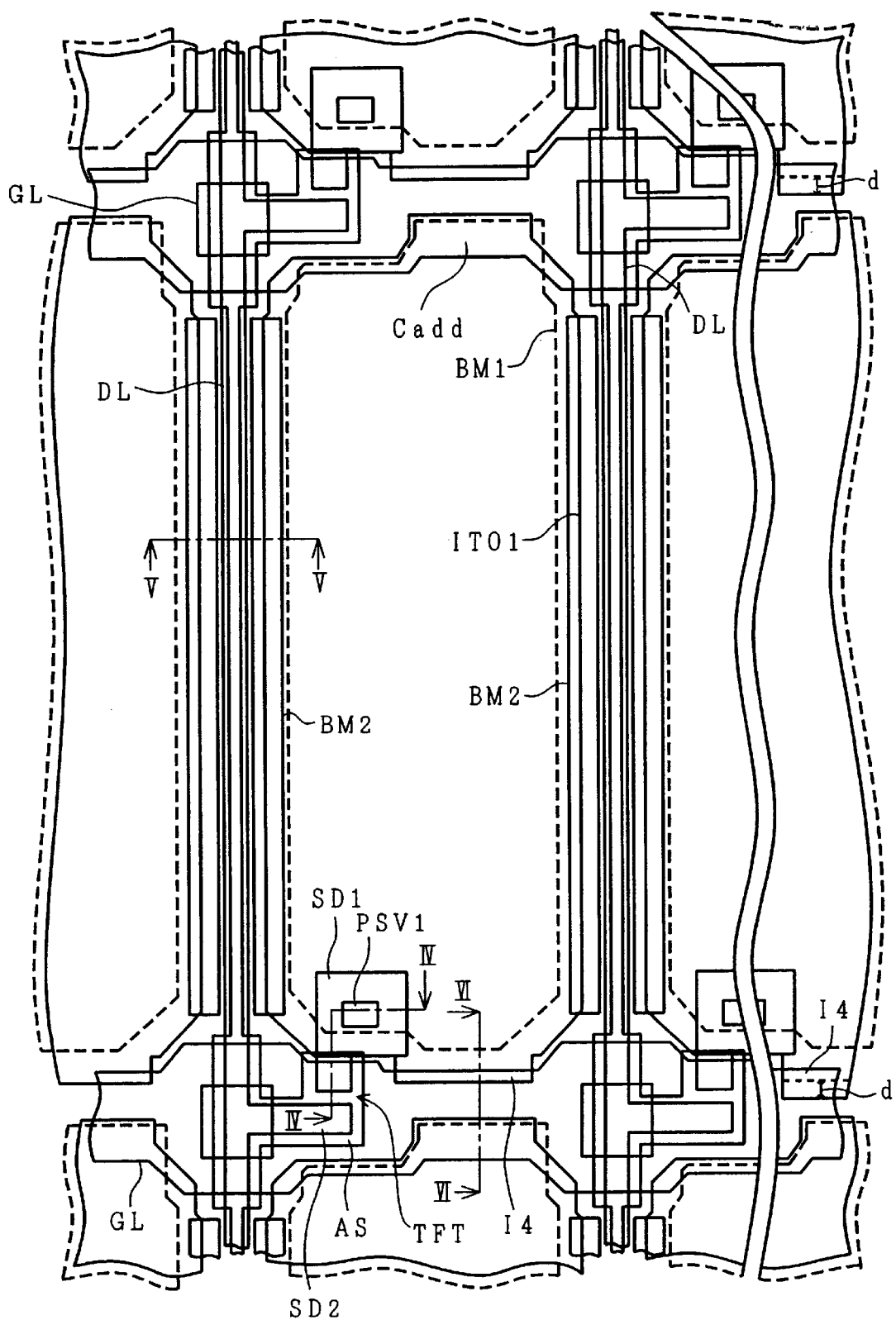
FIG. 29 is a plan view illustrating a pixel of the liquid crystal display device according to a still further embodiment of the present invention.
Figure 30:
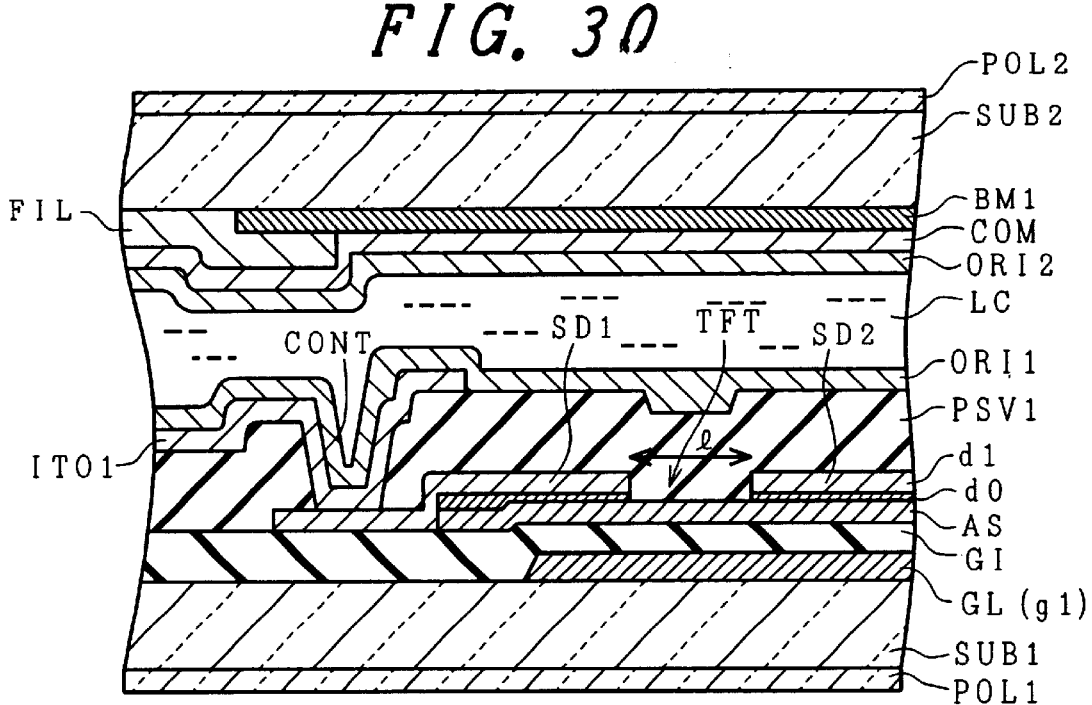
FIG. 30 is a sectional view taken along the line IV—IV of FIG. 29.
Figure 31:
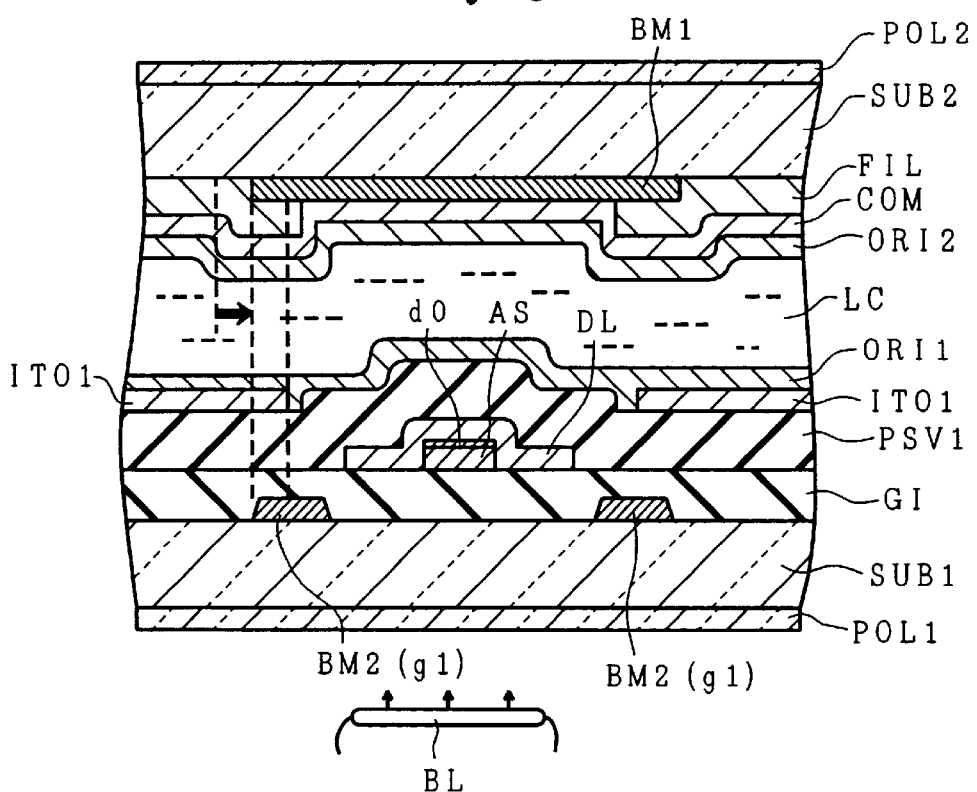
FIG. 31 is a sectional view taken along the line V—V of FIG. 29.
Figure 32:
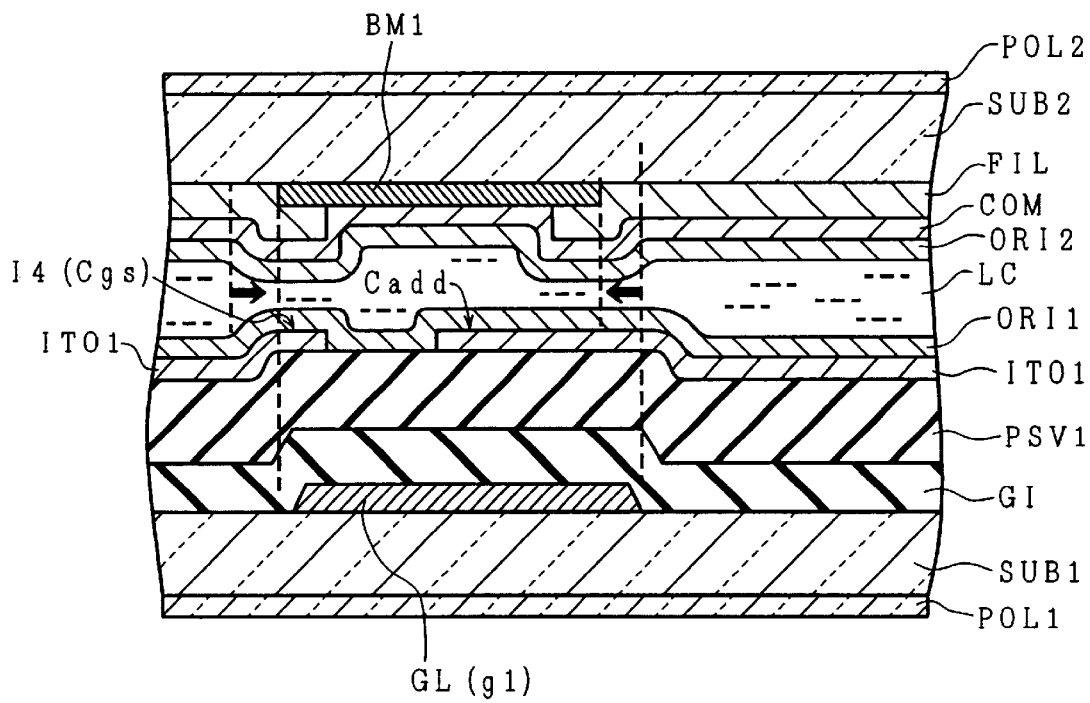
FIG. 32 is a sectional view taken along the line VI—VI of FIG. 29.

FIG. 29 is a plan view illustrating the constitution of the pixel region that corresponds to the area A in FIG. 2 according to the invention. FIG. 30 is a sectional view taken along the line IV—IV of FIG. 29, FIG. 31 is a sectional view taken along the line V—V of FIG. 29, and FIG. 32 is a sectional view taken along the line VI—VI of FIG. 29.

In the liquid crystal display panel as shown in FIG. 30, a thin-film transistor TFT and a pixel electrode ITO1 are formed on the side of the first transparent substrate SUB1 with the liquid crystals LC as a reference, and a color filter FIL and a black matrix pattern (first light-shielding film) BM1 are formed on the side of the second transparent substrate SUB2. As shown in FIG. 30, on the outer sides of the transparent glass substrates SUB1, SUB2 are (cross-Nicol arranged) a first polarizer plate POL1 and a second polarizer plate POL2 with their optical axes at right angles to each other.

First, on the surface of the first transparent substrate SUB1 of glass or the like on the liquid crystal side, there are formed gate signal lines GL that in the x-direction and are arranged in parallel lines in the y-direction. The gate signal line GL is constituted by a conducting layer gl composed of chromium, molybdenum, an alloy of chromium and molybdenum, aluminum, tantalum or titanium. In order to lower the resistance of the gate signal line GL, furthermore, the gate signal line GL may be constituted by using the above-mentioned laminated layers of conducting films. When aluminum is used as the gate signal line GL, furthermore, there may be used an alloy to which a metal such as tantalum, titanium or niobium is added in small amounts in order to eliminate a protuberance, such as hillocks or whiskers. A pixel electrode ITO1 of a transparent conducting film (e.g., indium-tin-oxide) is formed in most of the pixel region surrounded by the gate signal line GL and the drain signal line D1 that will be described later.

The thin-film transistor TFT is formed on part of the gate signal line GL in the pixel region on the left lower side in the drawing. The thin-film transistor TFT is formed by successively laminating a gate insulating film GI composed of, for example, SiN, a semiconductor layer AS composed of i-type amorphous silicon, a semiconductor layer d0 composed of amorphous silicon containing impurities, a drain electrode SD2 and a source electrode SD1, that are successively laminated. The drain electrode SD2 and the source electrode SD1 are formed simultaneously with the drain signal line D1.

Referring to FIG. 31, the drain signal line D1 is formed on the semiconductor layer d0 which comprises the insulating film GI, the semiconductor layer AS and amorphous silicon containing impurities, and is formed of a single conducting film, such as chromium, molybdenum, an alloy of chromium and molybdenum, aluminum, tantalum or titanium, or is formed of a laminate thereof. The drain signal line D1 is formed on the region where the semiconductor layer AS and the semiconductor layer d0 containing impurities are formed, in order that the drain signal line D1 will not be broken by the step created by the semiconductor layer AS and the semiconductor layer d0 containing impurities.

The drain electrode SD2 of the thin-film transistor TFT is formed integrally with the drain signal line D1, and the source electrode SD1 is formed so as to be separated from the drain electrode SD2 by a predetermined channel length 1. A protection film PSV1 which is an insulating film is formed on the source electrode SD1 and on the drain electrode SD2. The protection film PSV1 is provided to avoid the characteristics from being deteriorated by the direct contact of liquid crystals with the thin-film transistor TFT. The protection film PSV1 is a moisture-resistant film such as an organic resin film as represented by a silicon nitride film or a polyimide. A pixel electrode ITO1 is formed on the protection film PSV1. A through hole CONT is formed in the protection film PSV1 on the source electrode SD1 so that the source electrode SD1 and the pixel electrode ITO1 can be electrically connected together.

As shown in FIG. 32, furthermore, the holding capacitor element Cadd comprises a gate signal line (another gate signal line neighboring the gate signal line for driving the thin-film transistor TFT) GL as one electrode, a conducting layer formed simultaneously with the pixel electrode ITO1 as another electrode, and an insulating film GI and a protection film PSV1 interposed therebetween as dielectric films. The insulating film GI and the protection film PSV1 are formed simultaneously with the formation of those in the thin-film transistor TFT. Furthermore, the conductor layer which is the other electrode is formed simultaneously with the pixel electrode ITO1. Furthermore, an orientation film ORI1 for limiting the orientation of liquid crystals is formed on the whole surface of the pixel electrode ITO1.

In this embodiment, the protection film PSV1 which is an insulating film exists between the pixel electrode ITO1, the gate signal line GL and the drain signal line D1. Therefore, even when the pixel electrode ITO1 is superposed on the gate signal line GL or the pixel electrode ITO1 is superposed on the drain signal line D1 on a plane, no short-circuit occurs. In this embodiment, therefore, the pixel electrode ITO1 is formed in a large size, making it possible to increase the aperture of the pixel to increase the liquid crystal capacity Cpix and, hence, to decrease the holding capacity Cadd.

On the inner surface (liquid crystal side) of the second transparent substrate SUB2, formed of glass or the like, are successively laminated a first light-shielding film BM1, a color filter FIL, a common transparent electrode COM and an upper orientation film ORI2. The first light-shielding film BM1 comprises a light-shielding metal film made of a material, such as chromium or aluminum, or a light-shielding organic film obtained by adding a dye, a pigment or carbon to a resin film, such as of acrylic resin. The common transparent electrode COM comprises a transparent conducting film such as of ITO (indium-tin-oxide). The color filter FIL comprises a base material of organic resin film, such as acrylic resin, to which a dye or a pigment is added. Furthermore, a color filter protection film of an organic resin, such as an acrylic resin, may be provided between the color filter FIL and the common transparent electrode COM in order to prevent the liquid crystals LC from being contaminated with a dye or a pigment of the color filter FIL.

<Second Light-shielding Film BM2>

In this embodiment, as shown in FIGS. 29 and 31, a second light-shielding film BM2 of a light-shielding metal is formed on the first transparent substrate SUB1 on which the drain signal line D1 is formed. The second light-shielding film BM2 is formed of the same material as the conducting film gl that constitutes the gate signal line GL and is formed in the same layer as the gate signal line GL.

The second light-shielding film BM2 has a plane structure, as shown in FIG. 29 in which it is superposed on the pixel electrode ITO1 along the drain signal line DI, but is not superposed on the drain signal line DI. As shown in FIG. 31, furthermore, the second light-shielding film SUB2 is insulated and separated from the drain signal line D1 by the gate insulating film GI. Therefore, the second light-shielding film BM2 is not very likely to be short-circuited to the drain signal line DI. Moreover, the pixel electrode ITO1 and the second light-shielding film BM2 are insulated and separated from each other by the gate insulating film GI and the protection film PSV1.

The second light-shielding film BM2 has the function of increasing the brightness of the display panel by increasing the area of the transmission portion of the pixel electrode relative to the pixel, i.e., by increasing the numerical aperture. In the display panel shown in FIG. 31, a back light BL is provided on one side of the first transparent substrate SUB1. The back light BL, however, may be provided on the side of the second transparent substrate SUB2. For convenience, however, the following description deals with the case where the back light projects light from the side of the first transparent substrate SUB1 and the screen is viewed from the side of the second transparent substrate SUB2. The projected light passes through the first transparent substrate SUB1, and enters into the liquid crystals LC from a portion where no light-shielding film (gate signal line GL drain signal line DL, second light-shielding film BM2) is formed on the first transparent substrate SUB1. The light is controlled by a voltage applied across the common electrode COM formed on the second transparent substrate SUB2 and the pixel electrode ITO1 formed on the first transparent substrate SUB1.

In the normally white mode in which the light transmission factor of the display panel decreases when a voltage is applied to the pixel electrode ITO1, the periphery of the pixel electrode ITO1 must be widely covered with the first light-shielding film BM1 formed on the second transparent substrate SUB2. Otherwise, light that cannot be controlled with voltage leaks through a gap between the drain signal line D1 or the gate signal line GL and the pixel electrode ITO1, causing the contrast of the display to be deteriorated. Besides, the second transparent substrate SUB2 and the first transparent substrate SUB1 are stuck together with the liquid crystals sandwiched therebetween, requiring a large margin for fitting. Therefore, the numerical aperture becomes smaller than that of this embodiment in which the second light-shielding film BM2 is formed on the first transparent substrate SUB1.

In this embodiment, the light-shielding metal film gl of the same material as the gate signal line GL is used as the second light-shielding film SUB2. However, any film may be used provided it is capable of shielding light. For example, there may be used an insulating light-shielding film, such as an acrylic resin film containing dye, pigment or carbon to shield light.

<Method of Uniformalizing the Potential Drop Component $\Delta V$ of the Pixel Electrode>

FIG. 29 shows at the left side a plane structure of a pixel at the input terminal side and at the right side, the plane structure of a pixel remote from the input terminal (e.g., at the other side). Further, the direction of channel length 1 of the thin-film transistor TFT is perpendicular to the direction in which the gate signal line GL extends. Further, the pixel electrode ITO1 is provided with a portion 1 which is superposed on the gate signal line GL that selects the pixel electrode ITO1 to adjust the capacity Cgs between the gate and the source, in order to decrease the difference in the potential drop component $\Delta V$ of pixel electrode among the pixels.

In order to decrease the difference in the potential drop component $\Delta V$ of the pixel electrode caused by a distortion in the waveform of the scanning signal by utilizing the adjusting pattern 14 formed on the pixel electrode ITO1 shown in FIG. 29, the area where the adjusting pattern 14 is superposed on the gate signal line GL should be increased by a predetermined amount d starting from the pixels at the side close to the input terminal and going toward the pixels remote from the input terminal. In order to adjust the capacity Cgs between the gate and the source for each of the pixels in this embodiment, the pixel electrode ITO1 is extended up to a portion where the pixel electrode ITO1 is superposed on the gate signal line GL that is selected. Therefore, the gate signal line GL of a light-shielding metal exhibits the same function as the first light-shielding film BM1 covering the edges of the pixel electrode. Therefore, the first light-shielding film BM1 covering the portion 1 where the pixel electrode ITO1 and the gate signal line GL are superposed one upon the other, can be retracted in the direction of the gate signal line GL indicated by an arrow to increase the aperture of the pixel.

In this embodiment, furthermore, the holding capacity Cadd formed in a portion where the pixel electrode ITO1 is superposed on the gate signal line GL of the neighboring pixel and exhibits the function same as that of the first light-shielding film BM1, since the gate signal line GL of the neighboring pixel is formed of a light-shielding metal It is therefore possible to retract the first light-shielding film BM1 back to a position where the gate signal line GL is exposed, in order to increase the aperture of the pixel.

In this embodiment, furthermore, the protection film PSV1 and the insulating film GI are used as the dielectric for the capacity Cgs between the gate and the source. It is very unlikely that pin holes will exist at the same places in the protection film PSV1 and the insulating film GI. Therefore, there is little possibility that the pixel electrode ITO1 and the gate signal line GL will be short-circuited at a portion 14 for adjusting the capacity Cgs between the gate and the source.

Embodiment 6

Figure 33:
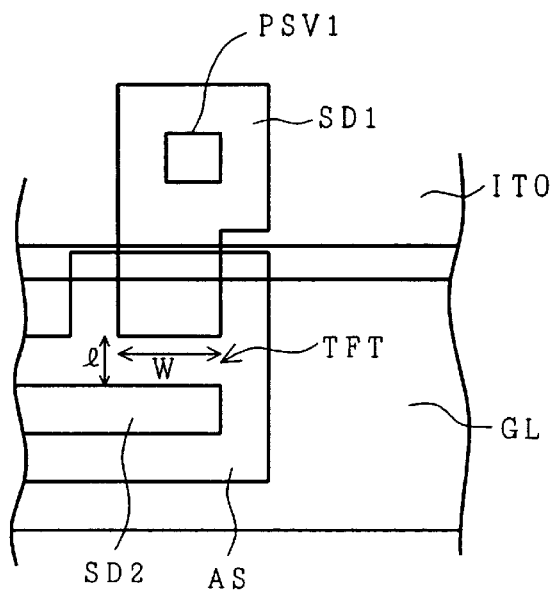
FIGS. 33(a) and 33(b) are plan views illustrating a major portion of a pixel of the liquid crystal display device according to another embodiment of the present invention.
Figure 33:
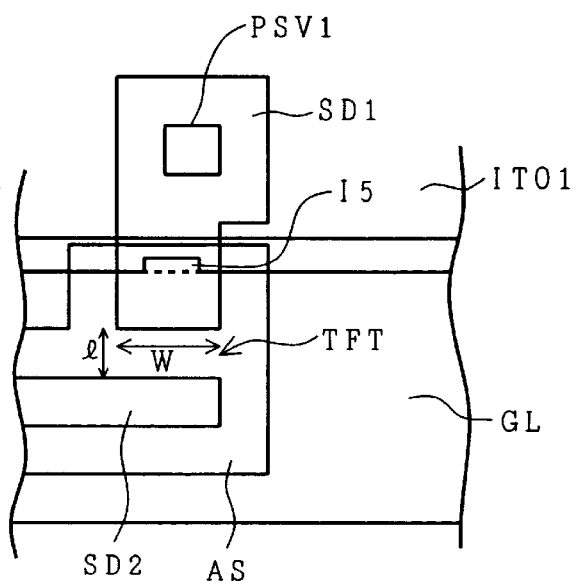

A yet further embodiment for adjusting the capacity Cgs between the gate and the source will be described with reference to FIGS. 33(a) and 33(b). FIGS. 33(a) and 33(b) are plan views of the pixel shown in FIG. 29 in proximity to the thin-film transistor TFT. Portions that are not shown in FIGS. 33(a) and 33(b) have the same constitution as that of the pixel shown in FIG. 29. FIG. 33(a) shows the constitution of the thin-film transistor TFT of a pixel on the input terminal side, and FIG. 33(b) shows the constitution of the thin-film transistor TFT on the side remote from the input terminal.

In this embodiment, the direction of the channel length I of the thin-film transistor TFT is perpendicular to the direction in which the gate signal line GL extends. The capacity Cgs between the gate and the source is adjusted by the adjusting pattern I5 provided on the gate signal line GL at a portion superposed on the source electrode SD1, in order to decrease the difference in the potential drop component ΔV of the pixel electrode among the pixels.

In order to decrease the difference in the potential drop component ΔV of the pixel electrode caused by a distortion in the waveform of a scanning signal by utilizing the adjusting pattern I5 formed on the gate signal line GL shown in FIGS. 33(a) and 33(b), the area where the adjusting pattern I5 is superposed on the source electrode SD1 should be increased toward the pixels remote from the input terminal.

Embodiment 7

Figure 34:
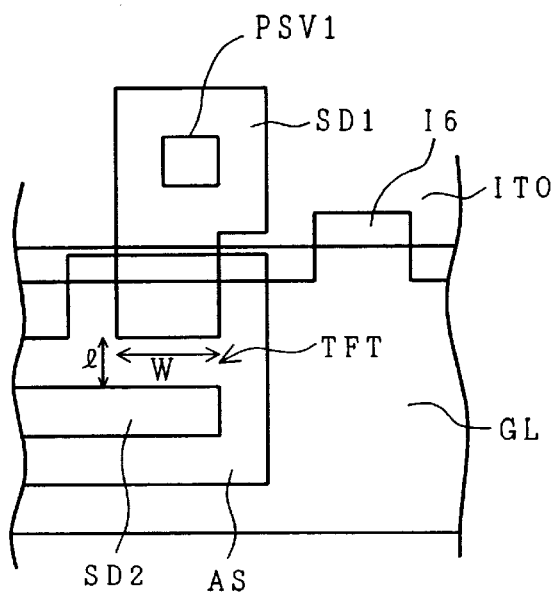
FIGS. 34(a) and 34(b) are plan views illustrating a major portion of a pixel of the liquid crystal display device according to a further embodiment of the present invention.
Figure 34:
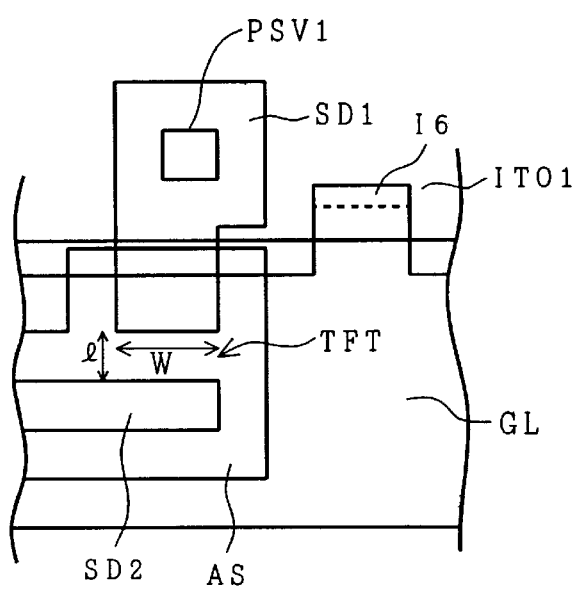

FIGS. 34(a) and 34(b), which illustrate a further embodiment for adjusting the capacity Cgs between the gate and the source, are plan views of the pixel shown in FIG. 29 in the proximity of the thin-film transistor TFT. The portions that are not shown in FIGS. 34(a) and 34(b) have the same constitution as the pixel shown in FIG. 29. FIG. 34(a) shows the constitution of the thin-film transistor TFT of a pixel on the input terminal side, and FIG. 34(b) shows the constitution of the thin-film transistor TFT on the side remote from the input terminal.

In this embodiment, too, the direction of the channel length 1 of the thin-film transistor TFT is perpendicular to the direction in which the gate signal line GL extends. The adjusting pattern I6 is provided on the gate signal line GL so as to be superposed on the pixel electrode ITO1, thereby to adjust the capacity Cgs between the gate and the source in order to decrease the difference in the potential drop component ΔV of the pixel electrode among the pixels. In order to decrease the difference in the potential drop component ΔV of the pixel electrode caused by a distortion in the waveform of a scanning signal by utilizing the adjusting pattern I6 formed on the gate signal line GL shown in FIGS. 34(a) and 34(b), the area where the adjusting pattern I6 is superposed on the pixel electrode ITO1 should be increased starting from the pixels remote from the input terminal and going toward the pixels close to the input terminal Embodiment 8

Figure 35:
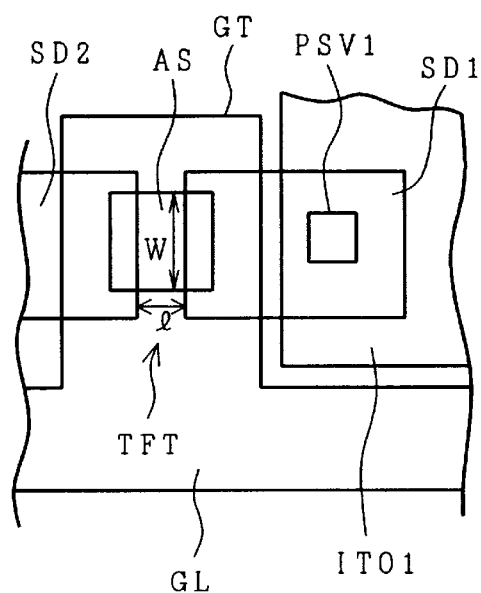
FIGS. 35(a) and 35(b) are plan views illustrating a major portion of a pixel of the liquid crystal display device according to still further embodiment of the present invention.
Figure 35:
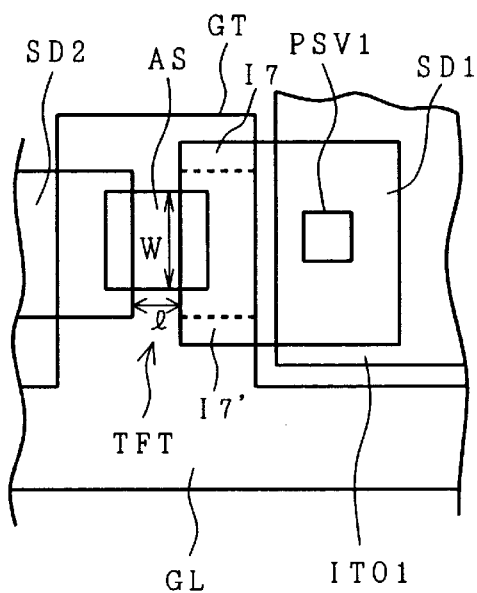

FIGS. 35(a) and 35(b), which illustrate another embodiment for adjusting the capacity Cgs between the gate and the source, are plan views of the pixel shown in FIG. 29 in the proximity of the thin-film transistor TFT. The portions that are not shown in FIGS. 35(a) and 35(b) have the same constitution as the pixel shown in FIG. 29. FIG. 35(a) shows the constitution of the thin-film transistor TFT of a pixel on the input terminal side, and FIG. 35(b) shows the constitution of the thin-film transistor TFT on the side remote from the input terminal In this embodiment, the gate electrode GT of the thin-film transistor TFT is branched from the gate signal line GL. Adjusting patterns I7 and I7' are provided at two portions where the source electrode SD1 of the thin-film transistor TFT is superposed on the gate electrode GT to adjust the capacity Cgs between the gate and the source and to decrease the difference in the potential drop component ΔV of the pixel electrode among the pixels. In order to decrease the difference in the potential drop component ΔV of the pixel electrode caused by a distortion in the waveform of a scanning signal by utilizing the adjusting patterns I7 and I' formed on the source electrode SD1 shown in FIGS. 35(a) and 35(b), the total area of the adjusting patterns I7 and I7' should be increased toward the pixels remote from the input terminal.

In the embodiment shown in FIGS. 35(a) and 35(b), the width of the semiconductor layer AS is selected to be smaller than the width of the source electrode SD1, and the channel width W of the thin-film transistor TFT is defined by the width of the semiconductor layer AS. The patterns I7 and I7' for adjusting the capacity Cgs between the gate and the source are provided on portions that are not superposed on the semiconductor layer AS. Therefore, provision of the adjusting patterns I7, I7' on the source electrode SD1 does not cause a change in the driving ability of the thin-film transistor TFT.

Furthermore, in this embodiment, the semiconductor layer AS is formed on only the region where the gate electrode GT exists on a plane in order to shield the light using the gate electrode GT to prevent light from falling on the semiconductor layer AS and to prevent erroneous operation of the thin-film transistor TFT. When the light is completely shielded by the gate electrode GT from falling on the semiconductor layer AS, therefore, there exists a portion without the semiconductor layer AS between the source electrode SD1 and the gate electrode GT, inviting the disadvantage that the capacity Cgs increases between the gate and the source. According to this embodiment, however, the capacity Cgs between the gate and the source is adjusted to decrease the difference in the potential drop component ΔV of the pixel electrode. This eliminates the drawbacks which result from an increase in the capacity Cgs between the gate and the source, that stems from the fact that the light is completely shielded by the gate electrode GT from falling on the semiconductor layer AS.

Embodiment 9

FIGS. 36(a) and 36(b), which illustrate a further embodiment for adjusting the holding capacity Cadd, are diagrams illustrating a plane structure of the pixel of the embodiment. The structure shown in FIGS. 36(a) and 36(b) is the same as that of the liquid crystal display device having the pixel structure shown in FIG. 29. Therefore, the portions that are not particularly described in this embodiment have the constitution same as that of the pixel shown in FIG. 29. FIG. 36(a) shows the constitution of a pixel on the input terminal side, and FIG. 36(b) shows the constitution of a pixel on the side remote from the input terminal. In this embodiment, the area of a portion where the pixel electrode ITO1 is superposed on the gate signal line GL of a neighboring pixel, is changed to adjust the holding capacity Cadd and to decrease the difference in the potential drop component ΔV of the pixel electrode among the pixels. In order to decrease the difference in the potential drop component ΔV of the pixel electrode caused by a distortion in the waveform of a scanning signal by adjusting the holding capacity Cadd shown in FIGS. 36(a) and 36(b), the area where the gate signal line GL is superposed on the pixel electrode ITO1 should be decreased by a predetermined amount d starting from the pixels on the side close to the input terminal and going toward the pixels remote from the input terminal thereby to decrease the holding capacity Cadd.

Embodiment 10

Figure 37:
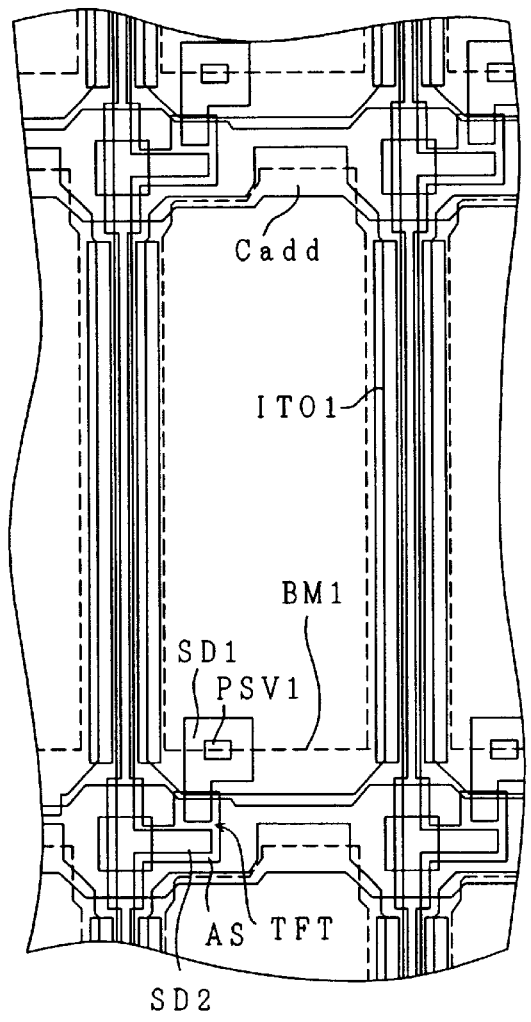
FIGS. 37(a) and 37(b) are plan views illustrating the pixel of the liquid crystal display device according to a still further embodiment of the present invention.
Figure 37:
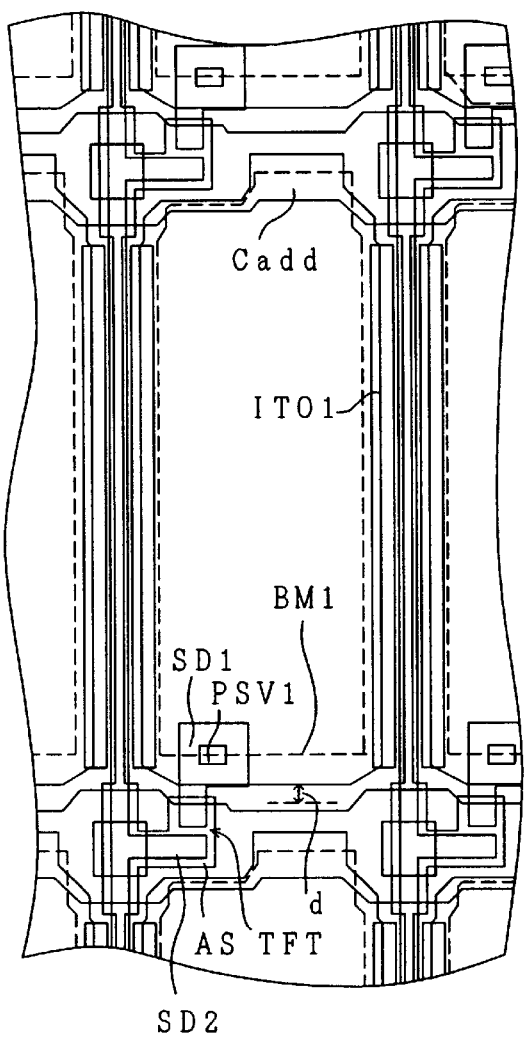

FIGS. 37(a) and 37(b), which illustrate a further embodiment for adjusting the liquid crystal capacity Cpix, are diagrams illustrating a plane structure of the pixel of the embodiment. The structure shown in FIGS. 37(a) and 37(b) is the same as that of the liquid crystal display device having the pixel structure shown in FIG. 29. Therefore, the portions that are not particularly described in this embodiment have the constitution same as that of the pixel shown in FIG. 29. FIG. 37(a) shows the constitution of a pixel on the input terminal side, and FIG. 37(b) shows the constitution of a pixel on the side remote from the input terminal In this embodiment, the area of the pixel electrode ITO1 is changed to change the area that is superposed on the common electrode COM to adjust the liquid crystal capacity Cpix and to decrease the difference in the potential drop component ΔV of the pixel electrode among the pixels. In order to decrease the difference in the potential drop component ΔV of pixel electrode caused by a distortion in the waveform of a scanning signal by changing the area of the pixel electrode ITO1 shown in FIGS. 37(a) and 37(b), the area of the pixel electrode should be decreased by a predetermined amount d starting from the pixels on the side close to the input terminal and going toward the pixels remote from the input terminal thereby to decrease the liquid crystal capacity Cpix.

In this embodiment, as shown in FIGS. 37(a) and 37(b), the area of the aperture of the first light-shielding film BM1 is the same between a pixel close to the input terminal and a pixel remote from the input terminal despite the fact that the area of the pixel electrode ITO1 is changed. In this A embodiment, furthermore, the shape of the pixel electrode ITO1 of a portion covered with the first light-shielding film BM1 is changed to change the area of the pixel electrode and to adjust the liquid crystal capacity Cpix. Therefore, there is no difference in the aperture through which light passes between a pixel close to the input terminal and a pixel remote from the input terminal and there is no difference in the brightness, either.

Embodiment 11

FIGS. 38(a) and 38(b), which illustrate a yet further embodiment for adjusting the area where the second light-shielding film BM2 is superposed on the pixel electrode ITO1 by forming the second light-shielding film BM2 using a light-shielding metal film, are diagrams illustrating a plane structure of the pixel of the embodiment. The structure shown in FIGS. 38(a) and 38(b) is the same as that of the liquid crystal display device having the pixel structure shown in FIG. 29. Therefore, the portions that are not particularly described in this embodiment have the constitution same as that of the pixel shown in FIG. 29. FIG. 38(a) shows the constitution of a pixel on the input terminal side, and FIG. 38(b) shows the constitution of a pixel on the side remote from the input terminal.

In this embodiment, the second light-shielding film BM2 is electrically connected to the gate signal line GL of the neighboring pixel in order to change the area where the second light-shielding film BM2 is superposed on the pixel electrode ITO1 in order to decrease the difference in the potential drop component ΔV of the pixel electrode among the pixels. The portion where the pixel electrode ITO1 is superposed on the second light-shielding film BM2 works in the same manner as the holding capacity Cadd, since the second light-shielding film BM2 is electrically connected to the gate signal line GL of the neighboring pixel.

In order to decrease the difference in the potential drop component ΔV of the pixel electrode caused by a distortion in the waveform of a scanning signal by changing the area where the second light-shielding film BM2 is superposed on the pixel electrode ITO1 shown in FIGS. 38(a) and 38(b), the area where the second light-shielding film BM2 is superposed on the pixel electrode ITO1 should be increased by a predetermined amount d starting from the pixels remote from the input terminal and going toward the pixels close to the input terminal to increase the holding capacity Cadd.

In this embodiment, though the holding capacity Cadd of each pixels shown in FIGS. 38(a) and 38(b) is not same value, the capacitance Cpix of each pixel is substantially the same value, because the size of each pixel electrode ITO1 is substantially the same and the area of each pixel's second light-shielding film BM2 (or one of holding capacitance electrode) is different. Therefore, it is easy to design the pixel's layout, because the value of the holding capacity Cadd is distinguishable from the value of the pixel's capacitance cpix.

A change in the area where the second light-shielding film BM2 is superposed on the pixel electrode ITO1 raises a problem in that the aperture of the pixel changes. However, the problem of a change in the aperture of the pixel can be solved by changing the area where the second light-shielding film DM2 is superposed on the pixel electrode ITO1 in a region formed in the second transparent substrate SUD2 and covered w i th the first light-shielding film BM1, as shown in FIGS. 38(a) and 38(b).

This embodiment has dealt with an example in which the second light-shielding film DM2 is electrically connected to the gate signal line GL. It is, however, also possible to decrease the difference in the potential drop component ΔV of the pixel electrode even by changing the area on which the pixel electrode ITO1 is superposed in a state where the second light-shielding film BM2 is electrically floated. When the area where the pixel electrode ITO1 is superposed is changed in a state where the second light-shielding film BM2 is electrically floated, it is possible to change the capacity Cds1 between the source and the drain and to change the capacity Cds2 between the pixel electrode and the drain signal line. In this case, the area where the second light-shielding film BM2 is superposed on the pixel electrode ITO1 should be increased toward the pixels closer to the input terminal.

Figure 38:
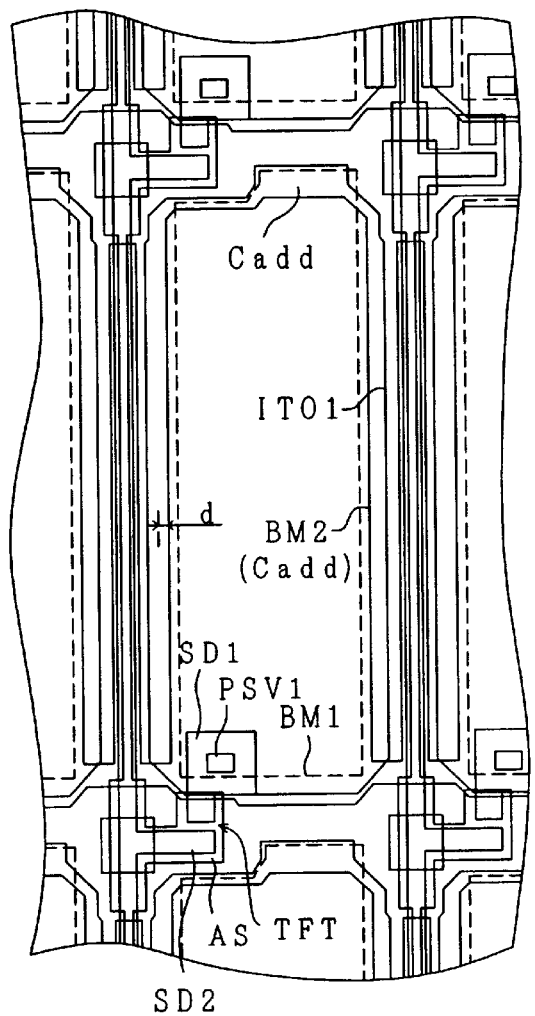
FIGS. 38(a) and 38(b) are plan views illustrating the pixel of the liquid crystal display device according to a yet further embodiment of the present invention.
Figure 38:
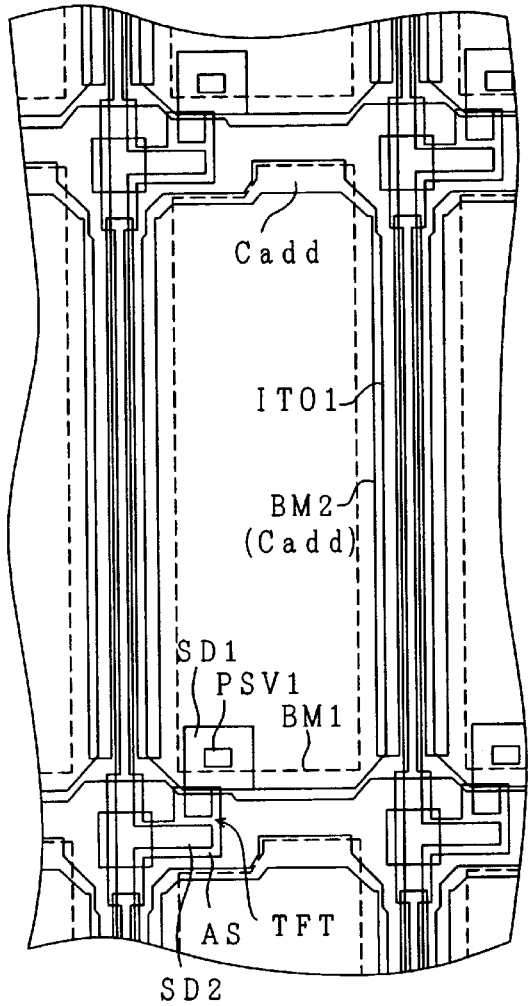

However, increasing the capacity Cds1 between the source and the drain or increasing the capacity Cds2 between the pixel electrode and the drain signal line, gives rise to the occurrence of the problem of crosstalk among the pixels. It is therefore desired to connect the second light-shielding film BM2 to the gate signal line GL as shown in FIGS. 38(*a*) and 38(*b*).

According to the liquid crystal display device of the present invention as will be obvious from the foregoing description, the occurrence of flickering is suppressed.

What is claimed is:

1. A liquid crystal display device comprising:

first and second gate signal lines formed on a first insulating substrate;

a terminal electrically connected to said first gate signal line to receive a drive voltage;

first and second thin-film transistors each having a source electrode, a gate electrode and a drain electrode;

a first pixel electrode electrically connected to either the source electrode or the drain electrode of said first thin-film transistor, a second pixel electrode electrically connected to either the source electrode or the drain electrode of said second thin-film transistor, both of said first and second pixel electrodes being disposed between said first and second gate signal lines;

a first video signal line electrically connected to the other one of the source electrode or the drain electrode of said first thin-film transistor, a second video signal line electrically connected to the other one of the source electrode or the drain electrode of said second thin-film transistor;

a second insulating substrate which is transparent and superposed on said first insulating substrate;

a transparent common electrode provided at a position where it is opposed to said first and second pixel electrodes of said second insulating substrate;

liquid crystals provided between said common electrode and said first and second pixel electrodes;

a first light-shielding film formed on said second insulating substrate, said first light-shielding film having first and second openings with respect to said first and second pixel electrodes, respectively, and covering peripheries of said first and second pixel electrodes; and second light-shielding films formed on said first insulating substrate, each of said second light-shielding films being electrically connected to said second gate signal line and overlapped with an edge region of either said first pixel electrode or said second pixel electrode while extending along either of said first video signal line or said second video signal line;

wherein the gate electrode of said first thin-film transistor is electrically connected to a first portion of said first gate signal line;

wherein the gate electrode of said second thin-film transistor is electrically connected to a second portion of said first gate signal line which is more remote than the first portion of said first gate signal line from said terminal;

wherein the area of a portion where said edge region of said second pixel electrode is overlapped with one of said second light shielding films is selected to be smaller than the area of a portion where said edge region of said first pixel electrode is overlapped with another of said second light-shielding films.

2. A liquid crystal display device comprising:

first and second gate signal lines formed on a first insulating substrate and arranged adjacent to one another;

a terminal electrically connected to said first gate signal line to receive a drive voltage;

first and second thin-film transistors each having a source electrode, a gate electrode and a drain electrode;

a first pixel electrode electrically connected to either the source electrode or the drain electrode of said first thin-film transistor, a second pixel electrode electrically connected to either the source electrode or the drain electrode of said second thin-film transistor, both of said first pixel electrode and said second pixel electrode being disposed between said first and second gate signal lines;

a first video signal line electrically connected to the other one of the source electrode or the drain electrode of said first thin-film transistor, a second video signal line electrically connected to the other one of the source electrode or the drain electrode of said second thin-film transistor;

a second insulating substrate which is transparent being superposed on said first insulating substrate;

a transparent common electrode provided at a position where it is opposed to said first and second pixel electrodes of said second insulating substrate;

liquid crystals provided between said common electrode and said first and second pixel electrodes;

a first light-shielding film formed on said second insulating substrate, said first light-shielding film having first and second openings with respect to said first and second pixel electrodes respectively and covering the peripheries of said first and second pixel electrodes; and second light-shielding films formed on said first insulating substrate, each of said second light-shielding films being electrically connected to said second gate signal line and overlapped with an edge region of one of said first pixel electrode and said second pixel electrode while extending along one of said first video signal line and said second video signal line;

wherein the gate electrode of said first thin-film transistor is electrically connected to a first portion of said first gate signal line, and the gate electrode of said second thin-film transistor is electrically connected to a second portion of said first gate signal line which is more remote than the first portion of said first gate signal line from said terminal;

wherein the area of a portion where said edge region of said second pixel electrode is overlapped with one of said second light shielding films is selected to be smaller than the area of a portion where said edge region of said first pixel electrode is overlapped with another of said second light-shielding film.

3. A liquid crystal display device according to claim 2, wherein said one of said second light-shielding films overlapped with said second pixel electrode is set back from said second opening of said first light-shielding film further than said another of said second light-shielding films overlapped with said first pixel electrode is set back from said first opening of said first light-shielding film.

4. A liquid crystal display device according to claim 2, wherein others of said second light-shielding films being electrically connected to said second gate signal line are overlapped with edge regions of said first and second pixel electrodes opposite to said edge regions thereof respectively, each of said second light-shielding films being extended along a video signal line adjacent to one of said first video signal line and said second video signal line at an opposite side of one of said first pixel electrode and said second pixel electrode to said one of said first video signal line and said second video signal line.

5. A liquid crystal display device according to claim 2, wherein a size of said first pixel electrode is substantially the same as a size of said second pixel electrode.

* * * * *